US012127709B2

(12) United States Patent
Rheaume

(10) Patent No.: US 12,127,709 B2
(45) Date of Patent: Oct. 29, 2024

(54) MODULAR BARBECUE SYSTEM AND KITS THEREFORE

(71) Applicant: Les Accessoires Multifonctions Inc., Quebec (CA)

(72) Inventor: Frederic Rheaume, Quebec (CA)

(73) Assignee: Les Accessoires Multifonctions Inc., Quebec (CA)

( * ) Notice: Subject to any disclaimer, the term of this patent is extended or adjusted under 35 U.S.C. 154(b) by 790 days.

(21) Appl. No.: 17/189,698

(22) Filed: Mar. 2, 2021

(65) Prior Publication Data

US 2021/0177201 A1 Jun. 17, 2021

Related U.S. Application Data

(63) Continuation of application No. 15/766,506, filed as application No. PCT/IB2016/056033 on Oct. 7, 2016, now Pat. No. 10,945,558.

(Continued)

(51) Int. Cl.
*A47J 37/07* (2006.01)
*A23B 4/052* (2006.01)
(Continued)

(52) U.S. Cl.
CPC ........... *A47J 37/0713* (2013.01); *A23B 4/052* (2013.01); *A47J 27/04* (2013.01); *A47J 27/21* (2013.01);
(Continued)

(58) Field of Classification Search
CPC .... A47J 37/07; A47J 37/0704; A47J 37/0709; A47J 37/0713; A47J 37/0781; A47J 37/0786
(Continued)

(56) References Cited

U.S. PATENT DOCUMENTS

| 2,940,381 A | | 6/1960 | Cottongim et al. |
| 3,364,844 A | * | 1/1968 | Felske ..................... A47J 27/04 |
| | | | 99/344 |

(Continued)

FOREIGN PATENT DOCUMENTS

| CA | 2973129 A1 | 7/2016 |
| CA | 2982420 A1 | 4/2017 |

(Continued)

OTHER PUBLICATIONS

YouTube Webpage, Char-Broil Hybrid-3 Burner Gas/Charcoal Grill, May 6, 2015, 14 pages, https://www.youtube.com/ watch?v=fL22LMDDXLA.

(Continued)

*Primary Examiner* — Reginald Alexander
(74) *Attorney, Agent, or Firm* — Snyder, Clark, Lesch & Chung, LLP

(57) ABSTRACT

There is provided a modular barbecue system and kits for adapting a gas barbecue to other types of cooking and other uses. The modular barbecue system comprises a heating compartment having a bottom wall and a peripheral defining a cavity, a heat source provided in the cavity of the heating compartment, a plurality of add-on components receivable in the cavity of the heating compartment, a plurality of steps provided in the cavity of the heating compartment for supporting the add-on components at different distances relative to the heat source. Add-on components such as a large basin, a flat basin, a perforated plate system, a strainer, a lid and a pump are combined to form a plurality of kits enabling steam cooking, maple sap boiling, double boiling, coal fire cooking, boiling, smoke cooking and water heating to expand the typical grilling method of a gas barbecue to various cooking techniques.

13 Claims, 36 Drawing Sheets

Related U.S. Application Data

(60) Provisional application No. 62/284,713, filed on Oct. 8, 2015.

(51) Int. Cl.
    *A47J 27/04*     (2006.01)
    *A47J 27/21*     (2006.01)
    *F24C 1/02*     (2021.01)
    *F24C 3/02*     (2021.01)
    *F24C 3/14*     (2021.01)

(52) U.S. Cl.
    CPC ............. *A47J 37/0786* (2013.01); *F24C 1/02* (2013.01); *F24C 3/027* (2013.01); *F24C 3/14* (2013.01); *A47J 2027/043* (2013.01); *A47J 37/0704* (2013.01); *A47J 2201/00* (2013.01)

(58) Field of Classification Search
    USPC ..... 99/448, 449, 340, 357; 126/25 R, 9 B, 4, 126/5
    See application file for complete search history.

(56) References Cited

U.S. PATENT DOCUMENTS

| | | | |
|---|---|---|---|
| 3,653,370 A | | 4/1972 | Shaper et al. |
| 4,334,462 A | | 6/1982 | Hefling |
| 4,512,249 A | | 4/1985 | Mentzel |
| 4,593,676 A | | 6/1986 | Wackerman |
| 4,922,079 A | * | 5/1990 | Bowen ................. A47J 27/04 219/415 |
| 4,924,844 A | | 5/1990 | Bransburg |
| 4,989,579 A | | 2/1991 | Murphy et al. |
| 5,211,105 A | | 5/1993 | Liu |
| 5,242,703 A | | 9/1993 | Stewart |
| 5,417,151 A | | 5/1995 | Ambler |
| 5,467,697 A | * | 11/1995 | Hunziker ................. A47J 36/24 99/449 |
| 5,711,210 A | * | 1/1998 | Kaufman .................. F24C 1/16 99/449 |
| 5,891,498 A | | 4/1999 | Boehler |
| 6,016,797 A | | 1/2000 | Nowicke, Jr. |
| 6,038,965 A | * | 3/2000 | Thorndyke ......... A47J 37/0786 99/449 |
| 6,173,644 B1 | * | 1/2001 | Krall .................... A47J 37/0713 126/41 R |
| D518,679 S | * | 4/2006 | Grutzke ......................... D7/348 |
| 7,997,188 B2 | * | 8/2011 | Umali .................... A47J 37/067 99/339 |
| 9,468,336 B2 | | 10/2016 | McQuillan |
| 2002/0040644 A1 | * | 4/2002 | McLemore ......... A47J 37/0786 99/450 |
| 2004/0083904 A1 | * | 5/2004 | Wei-Wen ................. A47J 27/04 99/483 |
| 2012/0247448 A1 | | 10/2012 | Thibodeaux |

FOREIGN PATENT DOCUMENTS

| | | | | |
|---|---|---|---|---|
| CN | 86205695 U | | 9/1987 | |
| CN | 1558737 A | | 12/2004 | |
| EP | 2745755 A1 | | 6/2014 | |
| KR | 20060004527 A | * | 9/2004 | ......... A47J 37/0681 |

OTHER PUBLICATIONS

YouTube Webpage, New Char-Broil 2-in-1 Hybrid Grill, Apr. 8, 2014, 9 pages, https://www.youtube.com/watch?v=kj83wdoCp4U.

* cited by examiner

MODULAR BARBECUE SYSTEM AND KITS THEREFORE

TECHNICAL FIELD

This application is a continuation of U.S. application Ser. No. 15/766,506, filed Apr. 6, 2018, which is a National Stage Application of International Application No. PCT/IB2016/056033, filed Oct. 7, 2016, which claims priority from U.S. Provisional Patent Application No. 62/284,713, filed Oct. 8, 2015. The entireties of all the above-listed applications are incorporated herein by reference.

The invention relates to the technical field of barbecue systems.

BACKGROUND OF THE ART

Barbecues are cooking devices that many people use during festive moments such as parties, family reunions or the like and barbecuing is often considered as outside cooking for spending a good time with friends, family or colleagues during which an important amount of food is cooked.

There exist three main types of barbecues, namely charcoal barbecues, gas grill barbecues and electric grill barbecues.

Electric barbecue grills closely resemble to kitchen electric grills. They are used mainly in apartments and locations where charcoal or gas barbecue grill are prohibited by fire regulation, and are generally not considered a suitable replacement for them.

Modern gas grill barbecues have generally been designed to have the following typical components: a main body with sets of casters at its lower end for displacing the barbecue, a main storage space, located over the casters and designed to receive a main propane or natural gas tank and shelves for storing utensils such as grids or cleaning equipment, and a heating compartment. Mounted at the bottom of the heating compartment are one or multiple burners, heat deflectors and a cooking grid for receiving the food to be cooked, at a suitable distance from the burners and heat deflectors. Other types of heat sources can also be provided, such as infrared burners mounted on the side of the heating compartment. A typical gas barbecues is also provided with a lid to cover the heating compartment during the cooking process.

While gas grills are popular for their convenience, they are generally associated with a less satisfactory smoky flavor than conventional charcoal grills or smokers. Gas barbecues are indeed typically designed to allow only one type of cooking, namely grilling. While some gas grills are equipped with small smokers boxes, they tend to be unsatisfactory with respect to providing smoky flavor.

The barbecue users looking for an enhanced flavor therefore tend to opt for charcoal barbecue grills. While this type of apparatus allows for a better smoky, grilled flavor or smoking meats and fish products, they are more burdensome to use than gas barbecue grills because of the time required to start the coals, preheating the grill and cleaning the grill after cooking.

Therefore, barbecues purchasers often face the dilemma of choosing between the convenience of gas barbecue grill and the taste of charcoal grills and those wanting both are left with limited options, aside from purchasing the two type of grilling apparatuses.

Despite its drawbacks, gas barbecue grill remains the most popular type of backyard barbecue apparatus. Despite its convenience, in northern countries such as Canada or in the northern states of the United States such Vermont, New York state or Maine, barbecue grills tend to be used only during the summer season. This is due to the fact that it is not convenient to cook outside during cold days, but also because the gas barbecue grills are designed to achieve a single purpose, namely to grill food. Even during the summer season, gas barbecue grills tend to be of limited use because they are designed for a single application. For instance, those wanting to slowly braise stews and the like, fry turkeys and other types of meat or boil corn need separate gas heaters and pots.

Therefore, it would be desirable to be provided with a way to extend the use of barbecue grills, and especially gas barbecue grills to applications other than grilling, such as charcoal grilling, smoking, boiling, steam cooking and/or braising.

SUMMARY

According to a broad aspect of this invention, there is provided a modular gas barbecue system. In this broad aspect, the system comprises a heating compartment having a bottom wall and a peripheral wall extending upwardly from the bottom wall. The peripheral wall includes a bottom end adjacent to the bottom wall and a top end, the bottom wall and peripheral walls defining a cavity. The system also comprises a heat source provided in the cavity of the heating compartment, a plurality of add-on components receivable in the cavity of the heating compartment, and a plurality of steps provided in the cavity of the heating compartment. Each of the plurality of steps is configured to support the add-on components in the cavity, and the plurality of steps allows the positioning of the add on components at a corresponding plurality of distances relative to the heat source.

In another aspect, the plurality of steps are defined on the peripheral wall of the heating compartment.

In still another aspect, the plurality of steps are removably secured to at least one of the bottom wall and the peripheral wall of the heating compartment.

In yet another aspect, the plurality of steps comprises a lower step proximate top the lower end of the peripheral wall, a top step proximate to the upper end of the peripheral wall and at least one intermediate step located between the lower step and the top step.

In another aspect, the heating compartment has a generally rectangular bottom wall and the peripheral wall comprises a back wall, a front wall and a pair of side walls. In this aspect, the rectangular bottom wall and the peripheral wall define a generally rectangular cavity.

In still another aspect, the plurality of steps are defined in the back wall and the front wall.

In yet another aspect, each of the plurality of steps comprises a back step component defined in the back wall and a front step component defined in the front wall.

In another aspect, the back wall and the front wall converge toward one another from the top end of the peripheral wall toward the bottom end of the peripheral wall.

In still another aspect, the plurality of steps are defined in the side walls.

In yet another aspect, the bottom wall is circular and the peripheral wall is curved.

In another aspect, the bottom and peripheral walls are curved.

In a further aspect, the modular barbecues system further comprises a lid receivable on the heating compartment for closing the cavity.

In a further aspect, the lid is pivotably attached to the peripheral wall of the heating compartment.

In yet another aspect, the modular barbecue system further comprises a base for supporting the heating compartment.

In still another aspect, the base comprises at least one leg.

In another aspect, the base comprises at least two spaced-apart legs.

In a further aspect, the at least two spaced-apart legs define a storage space therebetween.

In a further aspect, the base further comprises at least one shelf mounted in the storage space.

In a further aspect, the base comprises at least one storage rack mounted in the storage space, the at least one storage rack being configured to store one of the plurality of add-on components in the storage space.

In a further aspect, the barbecue system further comprises a shelf extending on one side of the base.

Preferably, the shelf is a foldable shelf.

In a further aspect, the heat source is provided on the bottom wall of the heating compartment.

In yet a further aspect, the heat source comprises at least one burner operatively connected to a combustible source.

In yet a further aspect, the at least one burner is a gas burner and the combustible source is a source of inflammable gas.

In yet a further aspect, the source of inflammable gas is a source of propane, a source of butane or a source of natural gas.

In yet a further aspect, the source of inflammable gas is a propane tank, or a butane tank.

In yet a further aspect, the heat source is a solid combustible. Preferably, the solid combustible is selected from the group consisting of wood, charcoal and briquettes.

In still a further aspect, the plurality of add-on components are selected from a group consisting of a large basin, a flat basin, a maple sap boiling kit, a double boiler kit, a lid, a strainer, a water heating kit, a charcoal conversion kit, a boiler kit, a smoker conversion kit, a steam cooking kit.

In still a further aspect, the add-on components are adapted to be combined with each other.

In still a further aspect, the large basin comprises a bottom wall, a front wall, a back wall, a pair of side walls, wherein the bottom wall, the front and back walls and the pair of side walls define a cavity and, wherein the large basin is adapted to be removably received on the lower step of the heating compartment.

In still a further aspect, the front and back walls of the large basin comprise a step, at the upper end thereof, for receiving at least one other add-on component thereon. Preferably, the at least one other add-on component is selected from a group consisting of a flat basin and a lid.

In still a further aspect, the flat basin comprises a bottom wall and a peripheral wall, the bottom wall and peripheral wall defining a cavity. In this aspect, the cavity is adapted to receive food, ingredients, liquids, or a solid combustible.

In still a further aspect, the flat basin is a perforated flat basin comprising a perforated bottom wall and a perforated peripheral wall.

In still a further aspect, the flat basin is configured to be receivable both in the large basin and on one of the plurality of steps of the heating compartment.

In still a further aspect, the peripheral wall of the flat basin comprises a top end and a lip extending therefrom. In this aspect, the lip of the flat basin is configured to engage the one step of the heating compartment to maintain the flat basin on the step.

In another aspect, the lid comprises a bottom wall and a peripheral wall. The peripheral wall comprises a front wall, a back wall and a pair of side walls. The peripheral wall further comprises a lip and handles removably secured to the peripheral wall for manipulating the lid.

In another aspect, the maple sap boiling kit comprises a plurality of large basins and at least one syphon. The at least one syphon includes two vertical legs connected by a connecting tube, each of the at least one syphon connecting a pair of large basins for allowing transfer of maple sap from one basin of the pair to the other basin of the pair.

In another aspect, the double boiler kit comprises on the large basin, one flat basin, the flat basin being receivable in the large basin, and one lid, the lid being receivable on the flat basin.

In another aspect, the water heating kit comprises a large basin and a water conveying apparatus mountable to the large basin.

In another aspect, the water conveying apparatus is a pump.

In another aspect, the pump is adapted for conveying water to be heated into the basin.

In yet another aspect, the pump is adapted for conveying heated water from the large basin to a water dispensing apparatus.

In yet another aspect, the water dispensing apparatus is selected from the group consisting of an outdoor shower, a trailer shower, a trailer sink and a portable radiator.

In yet another aspect, the charcoal conversion kit comprises a flat basin adapted to receive charcoal.

In another aspect, the smoker conversion kit comprises a flat basin comprising a cavity adapted to receive wood chips and, a perforated plate system receivable on the flat basin. The perforated plate system includes a base plate in contact with said flat basin and comprising a first set of holes, and a top plate comprising a second set of holes. The top plate is slidably mounted on the plate and is slidable between an open position and a closed position to control the amount of smoke. When the top plate is in open position, the first and second sets of holes are aligned while when the top plate is in closed position, the first one of the base and top plate closes the other one of the base plate and top plate.

In yet another aspect, the steam cooking kit comprises a large basin defining a cavity, a perforated flat basin receivable in the cavity of the large basin and a lid for closing the cavity of the large basin.

In yet another aspect, the boiler kit comprises a large basin defining a cavity, a strainer receivable in the cavity of the large basin and a lid for closing the cavity of the large basin.

According to another broad aspect, there is provided a kit for converting a barbecue into a maple sap boiler. In this broad aspect, the barbecue includes a heating compartment defining a cavity, a heat source provided in the cavity of the heating compartment and a plurality of steps provided in the cavity. The kit comprises, a plurality of large basins receivable in the cavity of the heating compartment and configured to be supported on one of the plurality of steps. The kit also comprises at least one syphon, the at least one syphon having two vertical legs connected by a connecting tube, each of the at least one syphon being configured to connect a pair of large basins for allowing transfer of maple sap from one basin of the pair to the other basin of the pair.

In a further aspect, the kit for converting a barbecue into a maple sap boiler also comprises a plurality of removable adaptors, the removable adaptors being removably attachable to the larges basins. The removable adaptors enable the large basin to be position on one of the plurality of steps in the cavity of the heating compartment.

According to another broad aspect, there is provided a kit for converting a gas barbecue into a smoker. In this broad aspect, the gas barbecue includes a heating compartment defining a cavity, a heat source provided in the cavity of the heating compartment and a plurality of steps provided in the cavity. The kit comprises a flat basin receivable in the cavity of the heating compartment and configured to be supported on one of the plurality of steps. The kit also comprises a perforated plate system receivable on the flat basin, the perforated plate system including a base plate in contact with the flat basin and comprising a first set of holes and a top plate comprising a second set of holes, the top plate being slidably mounted on the plate and being slidable between an open position and a closed position to control the amount of smoke, wherein when the top plate is in open position, the first and second sets of holes are aligned while when the top plate is in closed position, the first one of the base and top plate closes the other one of the base plate and top plate.

According to another broad aspect, there is provided a kit for converting a gas barbecue into a charcoal barbecue. The gas barbecue includes a heating compartment defining a cavity, a heat source provided in the cavity of the heating compartment and a plurality of steps provided in the cavity. The kit also comprises a flat basin receivable in the cavity of the heating compartment and configured to be supported on one of the plurality of steps, the flat basin being adapted to receive charcoal therein.

According to another broad aspect, there is provided a kit for converting a barbecue into a double boiler apparatus. In this aspect, the barbecue includes a heating compartment defining a cavity, a heat source provided in the cavity of the heating compartment and a plurality of steps provided in the cavity. the kit comprises a large basin receivable in the cavity of the heating compartment and configured to be supported on one of the plurality of steps, a flat basin receivable in the large basin, and a lid receivable on the flat basin.

According to another broad aspect, there is provided a kit for converting a barbecue into a water heater. In this aspect, the barbecue includes a heating compartment defining a cavity, a heat source provided in the cavity of the heating compartment and a plurality of steps provided in the cavity. The kit comprises a large basin receivable in the cavity of the heating compartment and configured to be supported on one of the plurality of steps, and a water conveying apparatus mountable to the large basin.

According to another broad aspect, there is provided a kit for converting a gas barbecue into a steam cooking apparatus. The barbecue includes a heating compartment defining a cavity, a heat source provided in the cavity of the heating compartment and a plurality of steps provided in the cavity. The kit comprises a large basin receivable in the cavity of the heating compartment and configured to be supported on one of the plurality of steps, the large basin defining a cavity, a perforated flat basin receivable in the cavity of the large basin, and a lid adapted for closing the cavity of the large basin.

According to another broad aspect, there is provided a kit for converting a gas barbecue into a boiling apparatus. The barbecue includes a heating compartment defining a cavity, a heat source provided in the cavity of the heating compartment and a plurality of steps provided in the cavity. The kit comprises a large basin receivable in the cavity of the heating compartment and configured to be supported on one of the plurality of steps, the large basin defining a cavity, a strainer receivable in the large basin, and a lid receivable on the strainer.

According to another broad aspect, there is provided a kit for converting a barbecue into a modular barbecue system adapted to receive a plurality of add-on components. The barbecue includes a heating compartment having a bottom wall and a peripheral wall extending upwardly from the bottom wall, the peripheral wall comprising a bottom end adjacent to the bottom wall and a top end. The bottom wall and peripheral walls define a cavity, and a heat source is provided in the cavity. The kit comprises at least one step base removably receivable in the cavity of the heating compartment, the step base extending upwardly from the bottom wall and being adapted to receive the plurality of add-on components thereon. The step base is configured to allow adjustment of a distance between the heat source and the plurality of add-on components to be received thereon.

In a further aspect, the step base comprises a plurality of height adjustable legs and a width adjustable cross-member, the cross-member being adapted to connect the legs at one end thereof.

In a further aspect, the height adjustable legs abut the bottom wall of the heating compartment and extend upwardly relative to the bottom wall, the legs being telescopic for accommodating different heights relative to the bottom wall.

In a further aspect, the cross-member connects the legs at one end thereof, the cross-member being telescopic for accommodating different widths of heating compartments, the cross-member being adapted to removably receive the add-on components thereon.

In a further aspect, the base step is removably mounted to the top end of the peripheral wall and extends downwardly therefrom. In this aspect, the step base is configured to accommodate different distances between the heat source and the plurality of add-on components when the add-on components are received thereon.

In a further aspect, the base step comprises pairs of arms and a width adjustable cross-member, the cross-member being adapted to connect the arms at one end thereof.

In a further aspect, the arms comprise a plurality of steps corresponding to different distances relative to the heat source, and the steps are adapted to removably receive the add-on components thereon.

In a further aspect, the arms comprise a pivot at one end thereof for pivotally connecting to the cross-member for accommodating different angles of the peripheral wall relative to the bottom wall.

In a further aspect, the cross-member is telescopic for accommodating different widths of heating compartments when the base step is placed therein.

BRIEF DESCRIPTION OF THE DRAWINGS

For a better understanding of the present, as well as other aspects, and further features thereof, reference is made to the following description which is to be used in conjunction with the accompanying drawings, where.

DETAILED DESCRIPTION

Figure 1:
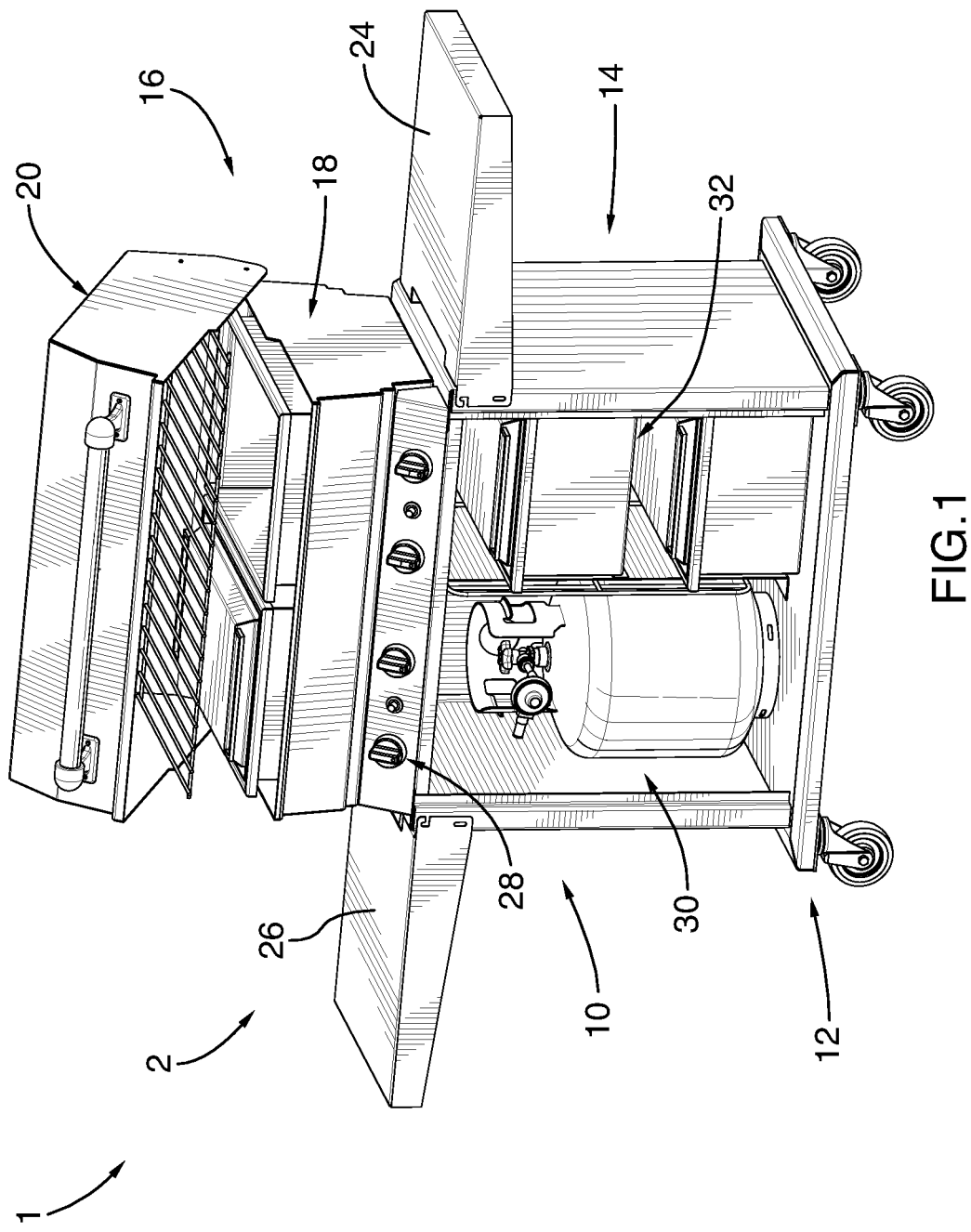
FIG. 1 is a perspective view of a modular barbecue system according to one embodiment, in which a barbecue grill is provided with a plurality of add-on components mounted in a heating compartment.

Referring to FIGS. 1 to 4, there is shown a modular barbecue system 1 for receiving add-on components. The modular barbecue system 1 offers different types of cooking or uses such as coal fire cooking, smoke cooking, plate cooking, double boiling, water heating, boiling, steam cooking and maple sap boiling by combining the various add-on components 100, 200, 300, 350, 400, 500, 600, 700, 800 and 900, as it will be explained further.

In this embodiment, the modular barbecue system 1 is a gas barbecue grill 2 comprising a main body 10 having a cart design of an usual gas grill barbecue and including a lower portion 12 with a plurality of caster wheels allowing the gas barbecue 2 to be moved, an intermediate portion 14 defining a storage space 30 and an upper cooking portion 16. The storage space 30 includes a shelf 32 for storing the gas or propane tank used as the fuel source. The storage space 30 is also configured to receive the add-on components 100, 200, 300, 350, 400, 500, 600, 700, 800 and 900 when they need to be stored.

The upper cooking portion 16 of the gas barbecue 2 comprises a heating compartment 18 and a lid 20, pivotally mounted to the heating compartment 18. Provided on the lid 20 is a handle 22 to help a user open and close the lid 20 during cooking. Provided on each side of the heating compartment 18 is a pair of foldable side trays or shelves 24, 26 for supporting food, cooking accessories or utensils during the operation of the gas barbecue. Control knobs 28 are disposed proximate to the heating compartment 18 to ignite the fire and to control the intensity of the flames during cooking operation of the modular barbecue system 1.

Figure 3:
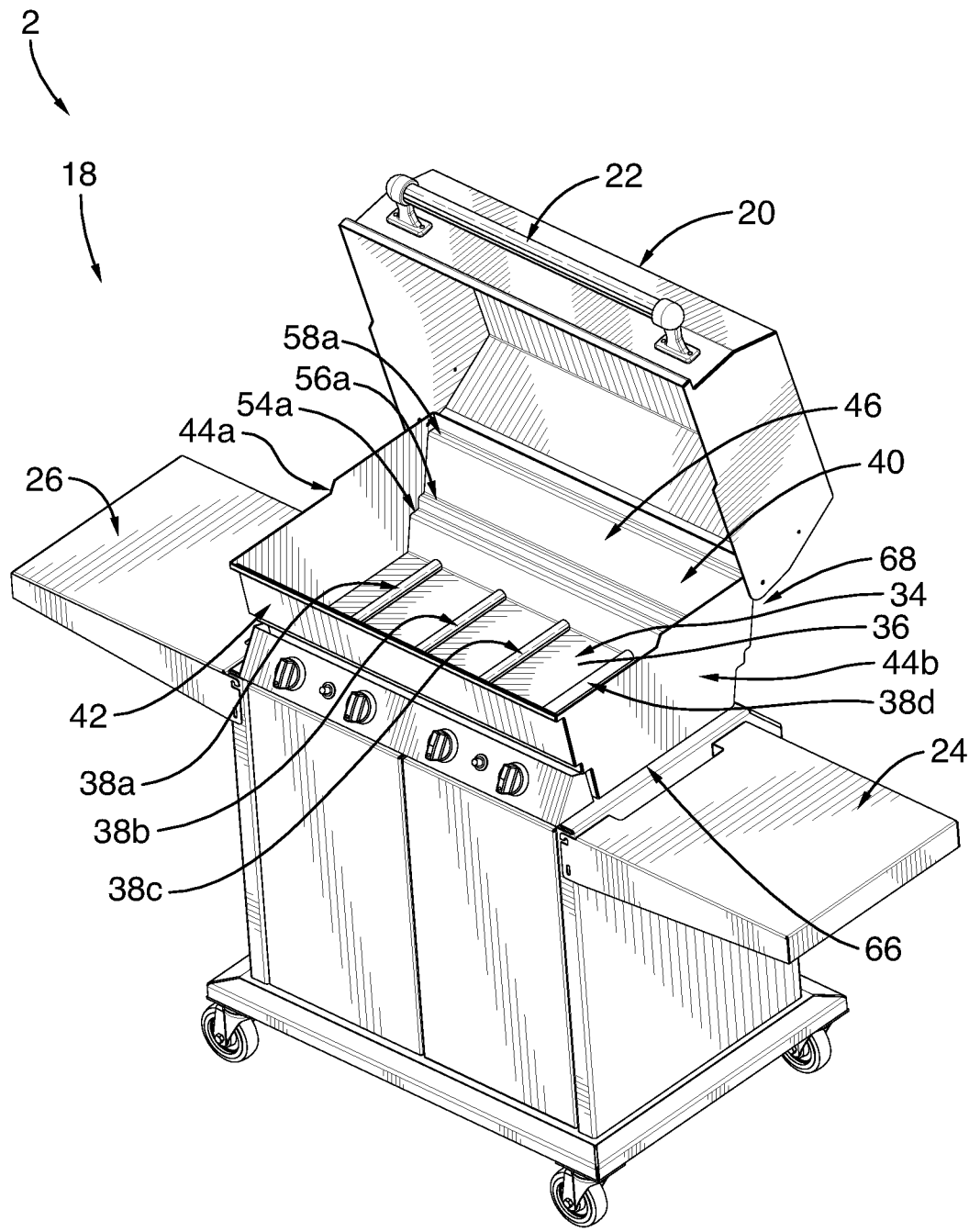
FIG. 3 is a perspective view of the heating compartment of the modular barbecue system of FIG. 1, without the add-on components.
Figure 4:
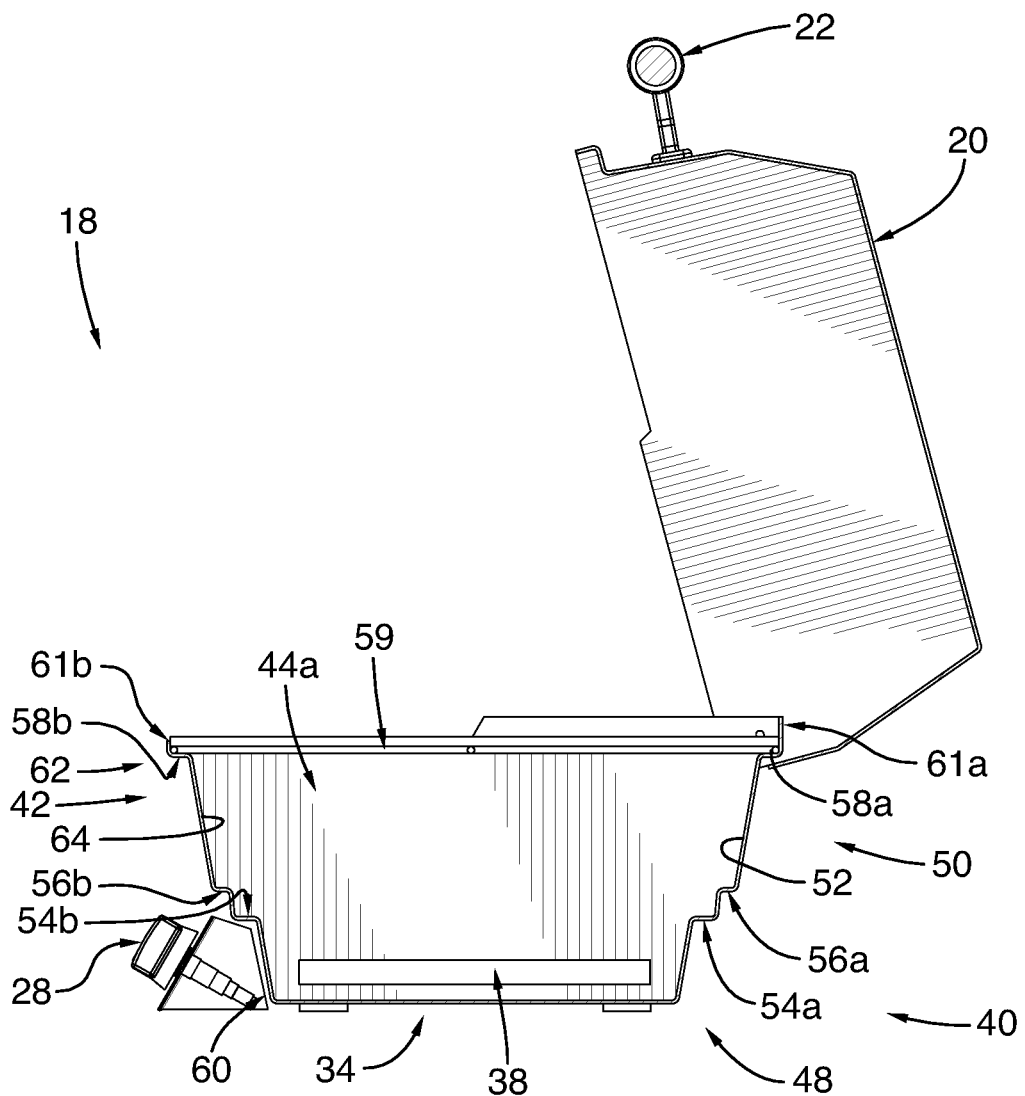
FIG. 4 is a right side cross-sectional view of the heating compartment of FIG. 3.
Figure 5:
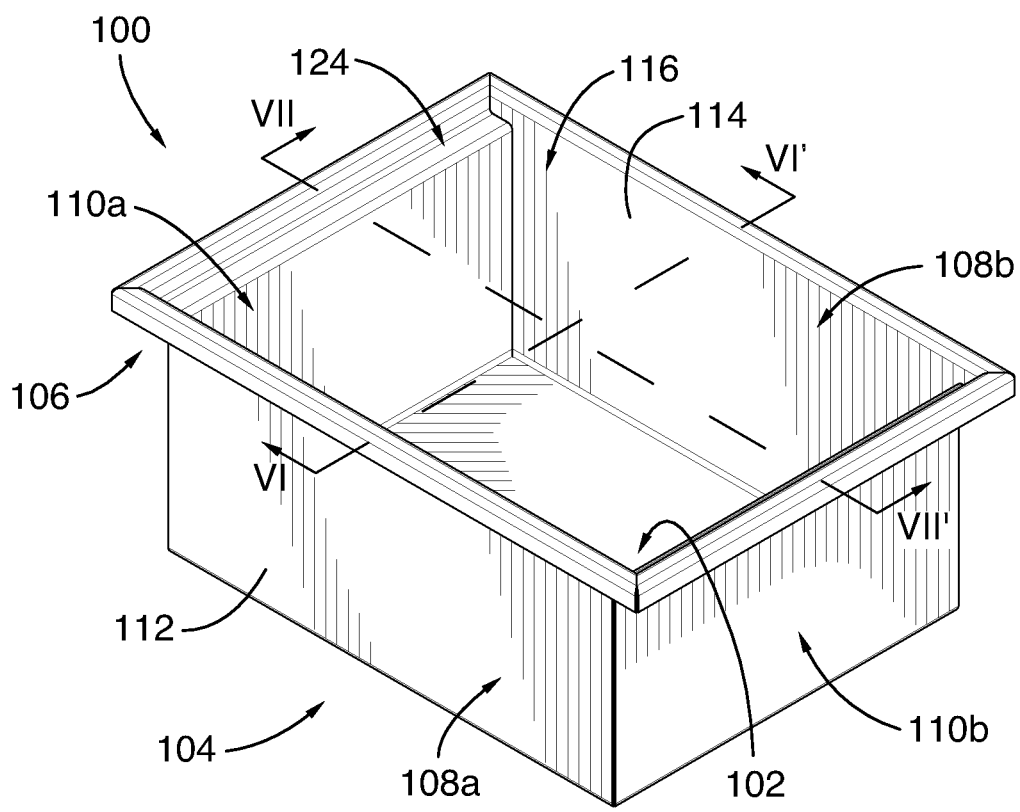
FIG. 5 is a perspective view of one embodiment of a large basin.

With reference to FIGS. 3 and 4, the heating compartment 18 of the upper cooking portion 16 of the gas barbecue will now be described in greater detail. The heating compartment 18 comprises a generally horizontal bottom wall 34 including an internal surface 36 on which a plurality of spaced burners 38a, 38b, 38c and 38d are horizontally disposed and installed, for cooking or heating food, ingredients or liquids. The heating compartment 18 further comprises a back wall 40, a front wall 42 and a pair of vertical side walls 44a, 44b defining a main cavity 46.

The back wall 40 comprises a lower end 48, an upper end 50 and an internal surface 52 extending from the lower end 48 to the upper end 50. The lower end 48 of the back wall 40 extends upwardly from the bottom wall 34 and comprises an outward extending lower step component 54a and an outward extending upper step component 56a, vertically distant from the bottom wall 34. At the upper end 50 thereof, the back wall 40 is provided with a grid supporting step component 58*a* and a vertical extending edge 61*a* defining the upper rim of the heating compartment 18.

Likewise, the front wall 42 comprises a lower end 60, an upper end 62 and an internal surface 64 extending from the lower end 60 to the upper end 62. The lower end 60 of the front wall 42 extends upwardly from the bottom wall 34. As with the back wall 40, the lower end 60 of the front wall 42 comprises an outward extending lower step component 54*b* and an outward extending upper step component 56*b*. As with the back wall 40, the upper end 62 of the front wall 42 comprises a grid supporting step component 58*b* and a vertical extending edge 61*b* defining the lower rim of the heating compartment 18.

The vertical side walls 44*a*, 44*b* extend from the back wall 40 to the front wall 42 and comprise a lower end 66, extending upwardly from the bottom wall 34, and an upper end 68. The upper end 68 of the side walls 44*a*, 44*b* connects the lower and upper rims of the front and back walls 42, 40 and, in the illustrated embodiment, allows the lid 20 to be pivotally connected to the heating compartment 18.

As best shown in FIG. 4, step component 54*a* of the back wall 40 and step component 54*b* of the front wall 42 are vertically aligned. Likewise, step component 56*a* of the back wall 40 is vertically aligned with step component 56*b* of the front wall 42. Together, complementary steps components 54*a*, 54*b* or 56*a*, 56*b* define steps 54 and 56 and collaborate to receive the add-on components 100, 200, 300, 350, 400, 500, 600, 700, 800 and 900 in the cavity 46 and to allow them to rest horizontally when properly positioned. In a like manner, the grid supporting steps components 58*a* and 58*b* of the back and front walls 40 and 42, define step 58 and collaborate to receive a cooking or warming grid 59 and allows it to remain horizontally positioned when food is received thereon to be cooked.

While the embodiment illustrated in FIGS. 1 to 4 include two sets of outward extending steps (i.e. step 54 and step 56) in addition to grid supporting step 58, the heating compartment 18 could be provided with more than three sets of steps for receiving the add-on components 100, 200, 300, 350, 400, 500, 600, 700, 800 and 900. Furthermore, the height of the steps could vary according to the add-on components to be received thereon, to optimize the distance between the add-on components and the burners 38 in order to improve heat transfer. While the illustrated embodiment shows that the step components 54*a*, 54*b*, 56*a*, 56*b* and 58*a*, 58*b* are provided only on the back and front walls 40, 42, the vertical side walls 44*a*, 44*b* could also be provided with steps complementary to those of the front and back walls 42, 40. Alternatively, steps provided on side wall 44*a*, 44*b* could be provided at vertical distances different than those of step component 54*a*, 54*b*, 56*a*, 56*b* and 58*a*, 58*b*, thus providing with more flexibility in terms of positioning the add-on components 100, 200, 300, 350, 400, 500, 600, 700, 800 and 900 relative to the burners 38*a*, 38*b*, 38*c* and 38*d* or for allowing for a greater variety of add-on components to be received in the heating compartment 18. In a further alternative, step components like step component 54*a*, 54*b*, 56*a*, 56*b* and 58*a*, 58*b* could be provided exclusively on side wall 44*a*, 44*b* instead of being provided on back and front walls 40, 42.

Turning now to FIGS. 5 to 34, the add-on components 100, 200, 300, 350, 400, 500, 600, 700, 800 and 900 will now be described. The add-on components are configured to collaborate either with each other and/or with the various step components 54*a*, 54*b*, 56*a*, 56*b* or 58*a*, 58*b* to provide the modular barbecue system 1 with different cooking methods and capabilities. In a preferred embodiment, the add-on components 100, 200, 300, 350, 400, 500, 600, 700 and 900 are preferably made out of stainless steel. The person of skill in the art will appreciate that they could alternatively be made out any other type of material that is suitable, such as aluminum, copper, ceramics, Pyrex™, cast iron or other alloys.

In a first embodiment, the add-on component is a large basin 100 (best shown in FIGS. 5 to 9),. The large basin 100 can be used to cook corn, lobsters, spaghetti sauce or any simmering meal and is configured to be positioned in the cavity 46 of the heating compartment 18 of the gas barbecue. As it will be explained below, the large basin 100 can nest a plurality of add-on components therefore adapting the cooking method as needed.

Figure 6:
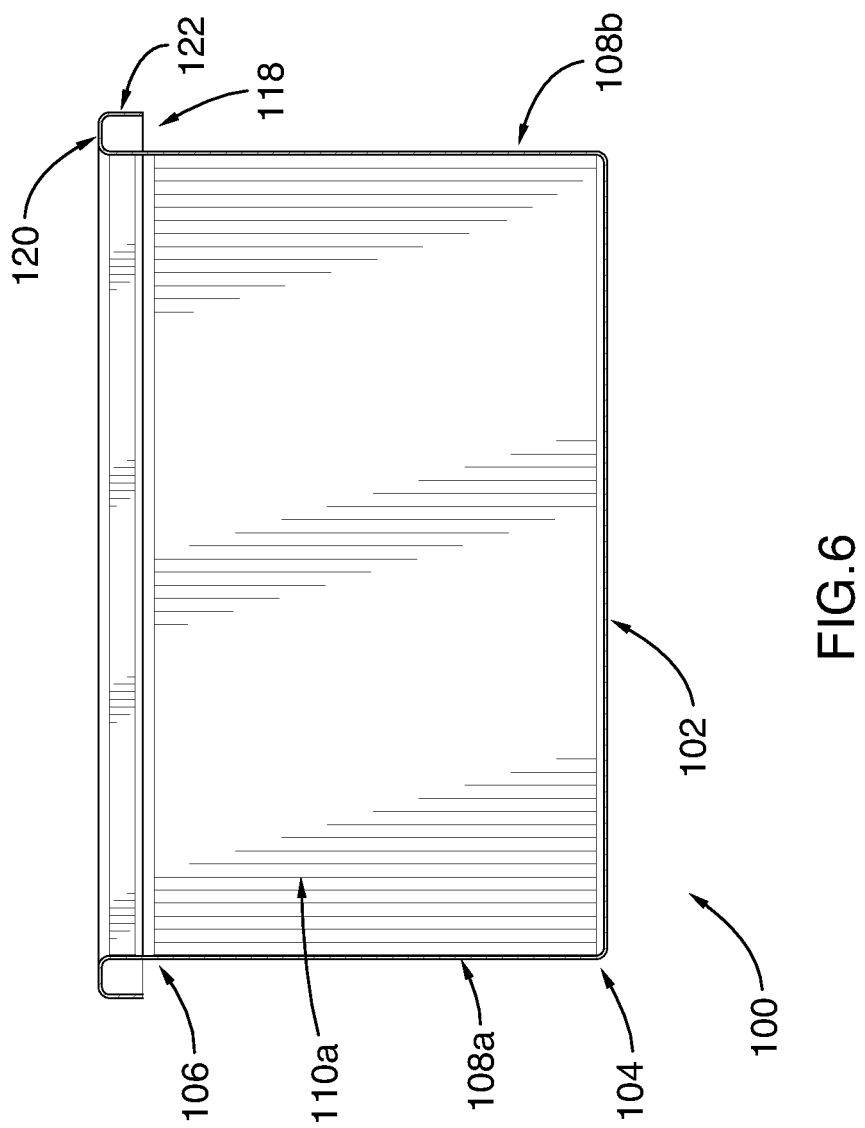
FIG. 6 is a right side cross-sectional view of large basin of FIG. 5 along line VI-VI'.

The large basin 100 has a generally rectangular shape and comprises a bottom wall 102, a lower end 104, an upper end 106, two pairs of spaced-apart vertical walls 108*a*, 108*b* and 110*a*, 110*b*, extending from the lower end 104 to the upper end 106, an external surface 112 and an internal surface 114 defining a main cavity 116 in which food, ingredients or liquids are placed to be cooked or heated. As best shown in FIG. 6, vertical walls 108*a*, 108*b* of the large basin 100 comprise, at the upper end 106 thereof, an outward lip 118 extending along the entire length of vertical walls 108*a*, 108*b*. The lip 118 is configured to help a user grasp the large basin 100 to manipulate or insert it in the heating compartment 18 and comprises a horizontal portion 120 extending outwardly relative to the vertical wall 108 and a downward extending portion 122.

Figure 7:
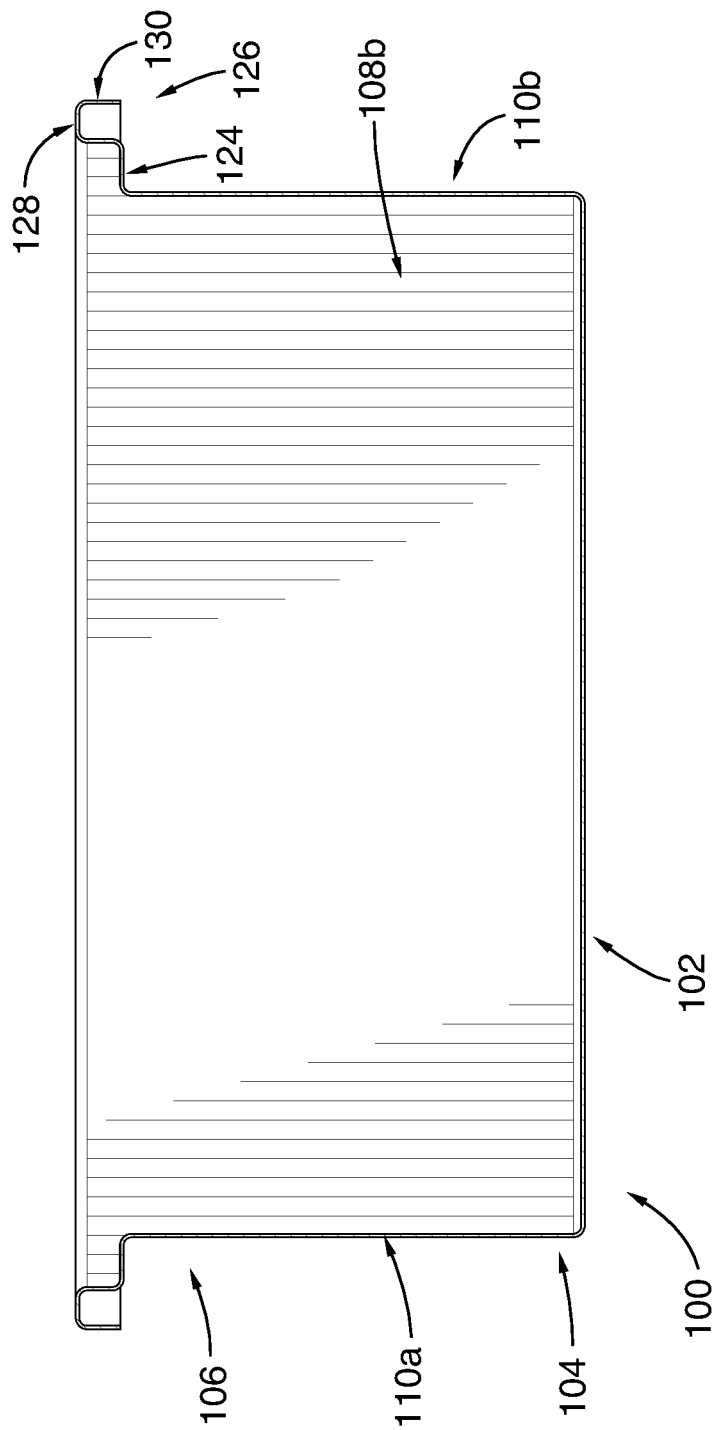
FIG. 7 is a front cross-sectional view of large basin of FIG. 5 along line VII-VII'.

Likewise, vertical walls 110*a*, 110*b* of the large basin 100 comprise, at the upper end 106 thereof, an outward extending step 124 for receiving different add-on components. Each vertical wall 110*a*, 110*b* comprises an outward extending lip 126, extending from step 124, comprising a horizontal portion 128 and a downward extending portion 130, extending the entire length of vertical walls 110*a*, 110*b*, as shown in FIG. 7. Although the illustrated embodiment of the large basin shows the step 124 located on the upper end of walls 110*a*, 110*b*, in an alternative embodiment, the step 124 of the large basin 100 could be located at a different height relative to the bottom wall 102 or could be located only on vertical walls 108*a*, 108*b* or on all the vertical walls 108*a*, 108*b* and 110*a*, 110*b*.

Figure 2:
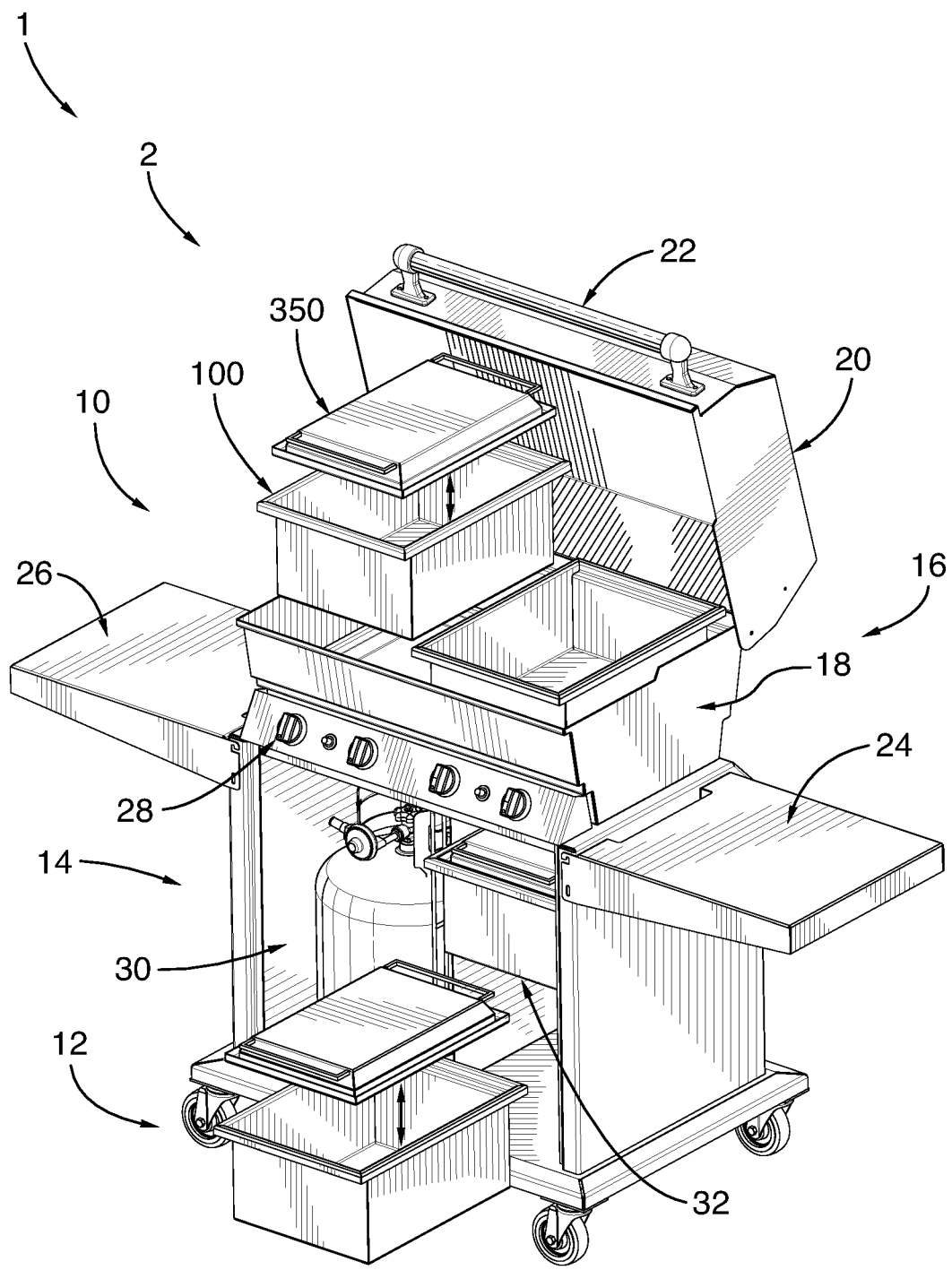
FIG. 2 is an exploded perspective view of the modular barbecue system of FIG. 1.
Figure 8:
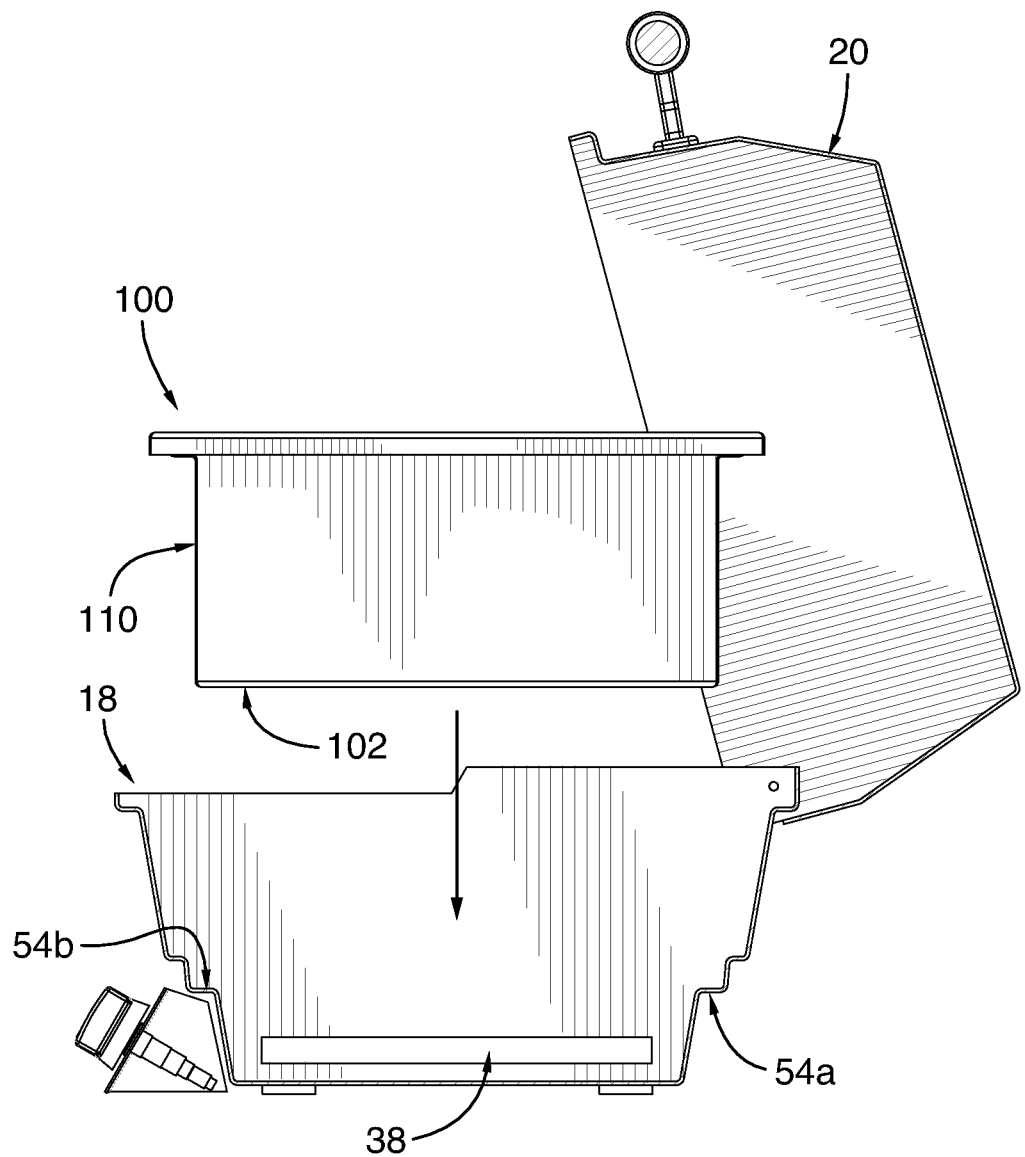
FIG. 8 is a right side cross-sectional view of the large basin being positioned in the heating compartment.
Figure 9:
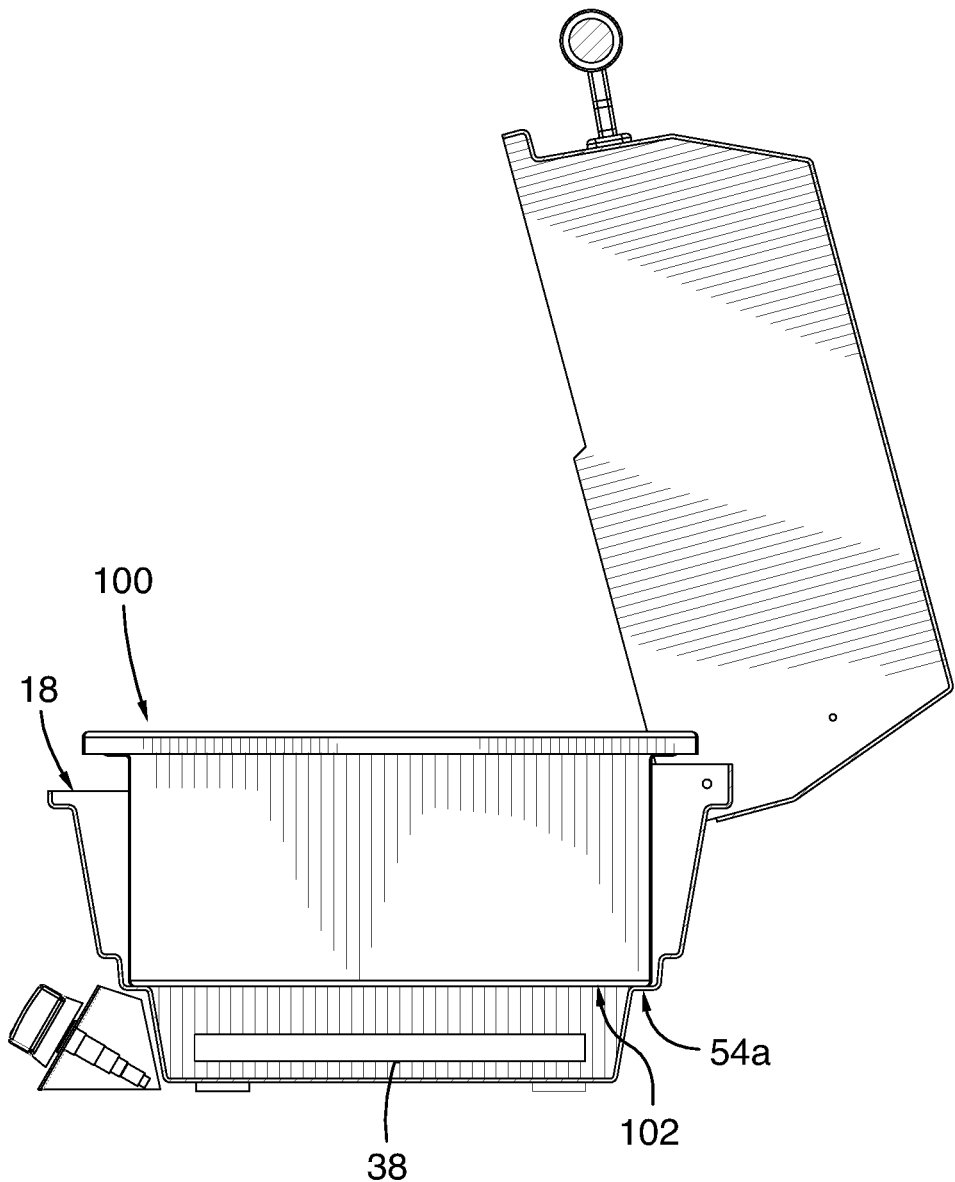
FIG. 9 is a right side cross-sectional view of the large basin of FIG. 5 positioned in the heating compartment.

Turning now to FIGS. 8 and 9, the use of the large basin 100 with the modular system 1 will now be explained. In order to position the large basin 100 in the heating compartment 18 of the gas barbecue 2, the deflectors or heat plates located over the burners 38 (not shown) as well as the main cooking grid 59 of the grill 2 are removed. The large basin 100 is then positioned in the heating compartment 18 of the gas barbecue. As best shown in FIG. 2, the width of the large basin 100 (i.e. the distance between side walls 108*a*, 108*b*) is about half the width of the heating compartment 18 (i.e. the distance between side walls side walls 44*a*, 44*b*). As such, large basin 100 can be positioned, either on the left side, the right side or at any position between the left side and the right side of the heating compartment 18 by aligning in parallel either vertical wall 108*a* or 108*b* of basin 100 with side walls 44*a* or 44*b*. Once positioned in the main cavity 46 of the heating compartment 18, the external surface 112 of the bottom wall 102 of the large basin 100 abuts the lower step components 54*a*, 54*b* of the heating compartment 18. As best shown in FIG. 9, in this position, the large basin 100 is located over the burners 38 at a distance tending to optimize and improve the heat transfer from the burners 38 to the large basin 100, as compared to a recipient that would be placed on the grid (e.g. grid 59) of a conventional barbecue for instance. Furthermore, the height of the large basin 100 slightly exceeds the height of the heating compartment 18. Therefore, food can either be placed directly in the large basin 100 to be cooked, for instance to cook corn, lobsters, spaghetti sauce or any simmering meal. In an alternate embodiment, a cooking grid (e.g. grid 59) can be placed on top of the large basin 100. When the large basin is filled with water, such a configuration enables steam cooking, preferably when the lid 20 is closed to maximize concentration of heat and steam.

Although in the illustrated embodiment the large basin 100 has a generally rectangular shape, it will be understood that other configurations are possible without departing from the scope of this embodiment. For instance, in an alternative embodiment the large basin 100 could have a square, circular or oval shape configured to engage step components 54*a*, 54*b*, 56*a*, 56*b* or 58*a*, 58*b*. In a further alternate embodiment, the large basin 100 could be configured to removably receive a plurality of removably secured adaptors (not shown) located on the external surface 112 of the vertical walls 110*a*, 110*b* and configured to fit flush with the bottom wall 102 of the large basin 100. The adaptors (not shown) could therefore allow the large basin 100 to abut a unique internal step of conventional heating compartments of gas grill barbecues when the large basin 100 is smaller than the width of the heating compartments, thus providing the large basin the possibility to be installed in a variety of different heating compartments of different barbecues.

Figure 10:
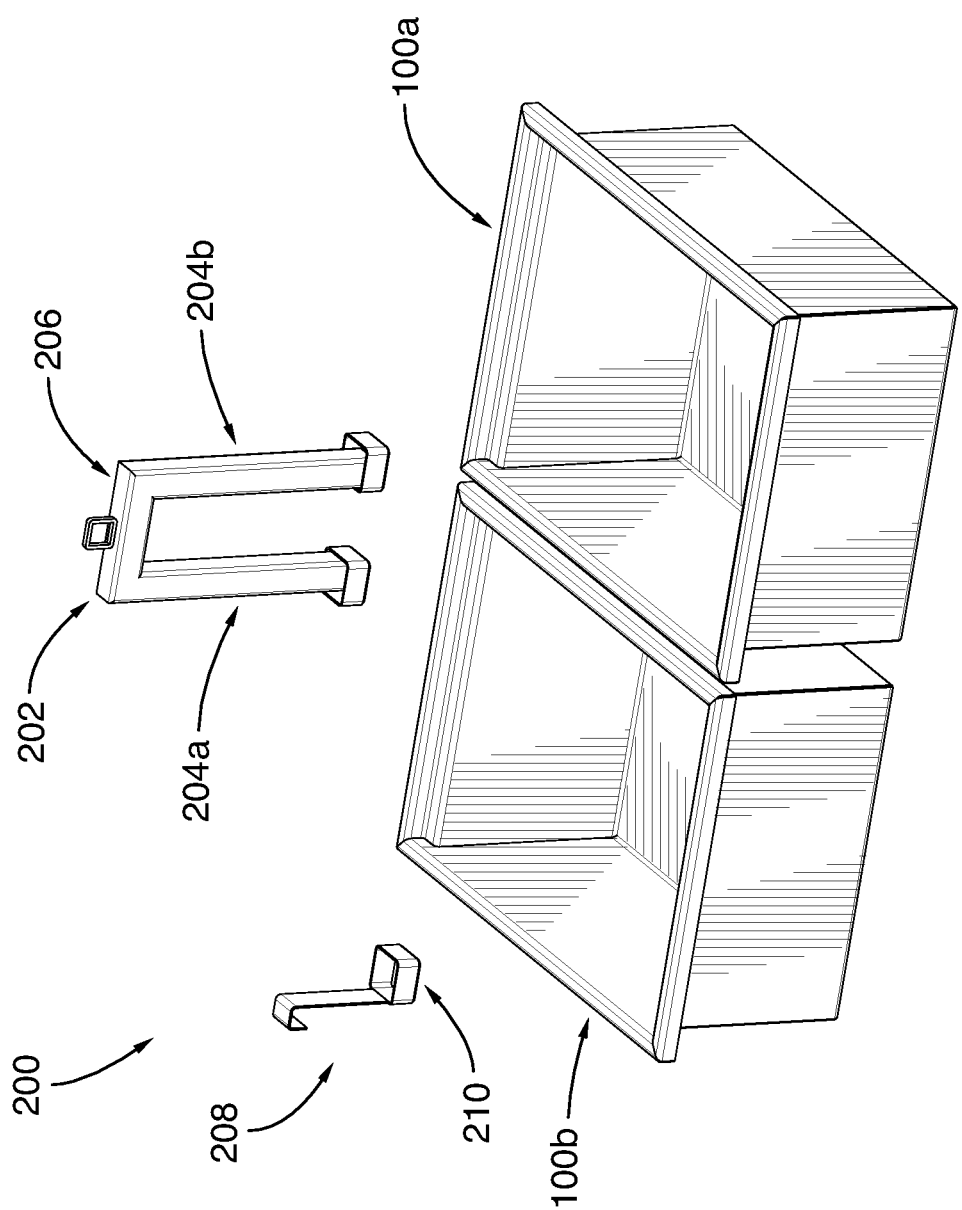
FIG. 10 is an exploded perspective view of a maple sap boiling kit.
Figure 11:
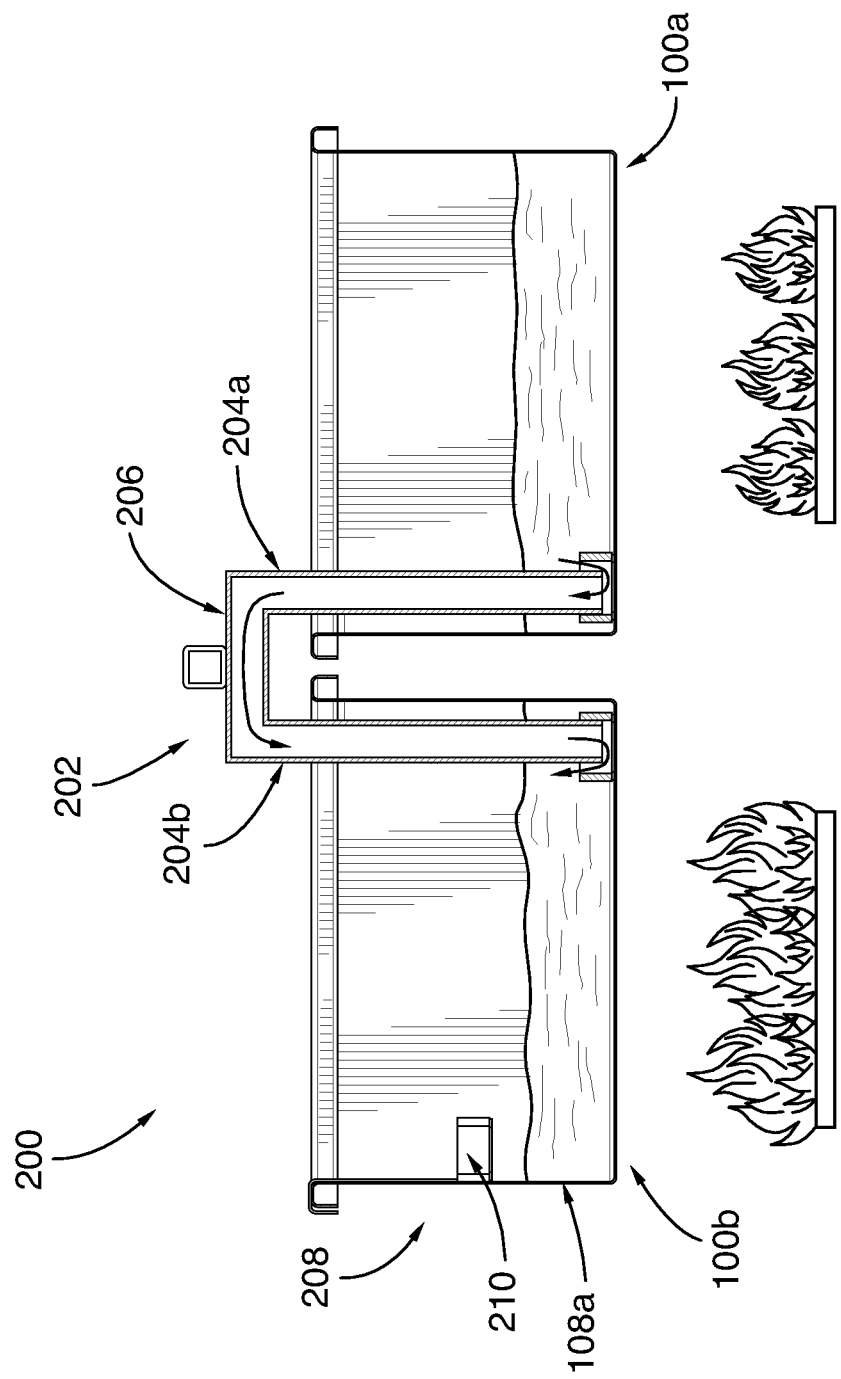
FIG. 11 is a front cross-sectional view of the maple sap boiling kit of FIG. 10 when assembled.
Figure 12:
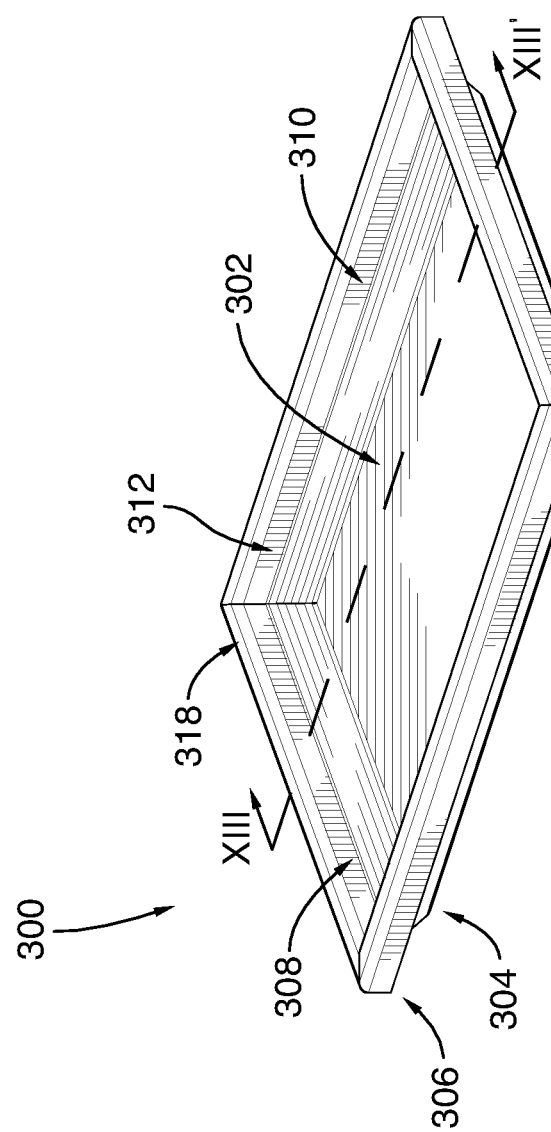
FIG. 12 is a perspective view of a first embodiment of a flat basin.
Figure 13:
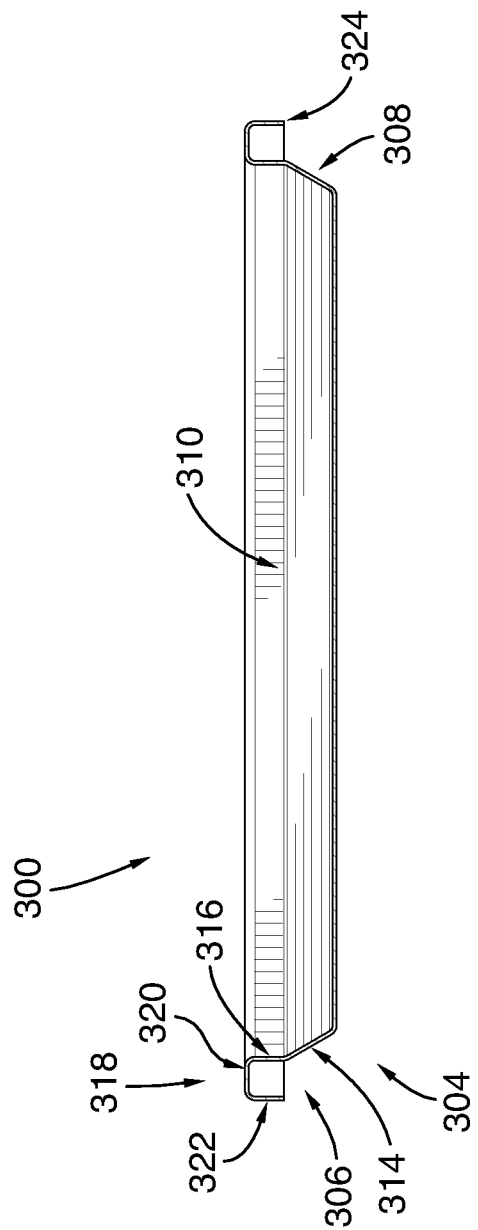
FIG. 13 is a front cross-sectional view of the flat basin of FIG. 12 along line XIII-XIII'.

Turning now to FIGS. 10 and 11, a second embodiment of an add-on component 200 will now be described. In this embodiment, the add-on component is a maple sap boiling kit 200 configured to transform the barbecue grill 2 into a maple syrup boiler. In this embodiment, the gas barbecue combined with the maple sap boiling kit 200 are used to provide different boiling stages, to evaporate maple sap in order to produce maple syrup. In this embodiment, the maple sap boiling kit 200 includes a pair of large basins (in this example, large basins 100*a*, 100*b*), generally corresponding to basin 100, and placed side by side along their vertical side walls 108*a*, 108*b*. The maple sap boiling kit 200 further includes a U-shaped syphon 202 having the usual shape of two identical elongated tubes 204*a*, 204*b* connected therebetween with a connecting tube 206 and all having square sections. The U-shaped syphon 202 is preferably made out of stainless steel and enables maple sap to communicate between both basins 100*a*, 100*b* as one basin is filled with maple sap to be boiled. In an alternative embodiment, the sections of the of the connecting tube 206 and tubes 204*a*, 204*b* could be either circular, oval or have any other shape allowing the U-shaped syphon 202 to connect the two large basin 100*a*, 100*b*. To allow for final evaporation of the maple syrup and prevent further maple sap to be conveyed to large basin 100*b*, syphon 202 can be removed, as known to those skilled in the art.

The maple sap boiling kit 200 further comprises a container 208, preferably made out of stainless steel, securable to either one of the vertical side walls 108*a*, 108*b* of large basin 100*b* by a hook or any suitable means. The container 208 comprises a receptacle 210 at the bottom end thereof for receiving either butter, an oily material, cooking fat or any suitable material that a person of skill in the art would know to avoid the creation of an excessive amount of foam resulting from the boiling of maple sap which would ultimately spill out of large basin 100*b*.

The maple sap boiling kit 200 is installed in the heating compartment 18 by aligning in parallel side walls 108*a* and 108*b* of large basins 100*a*, 100*b* and by using the same procedure as described for the installation of the large basin 100. Subsequently, maple sap is poured in large basin 100*a* which will act as a first preheating and boiling stage for evaporating an important amount of water, therefore increasing the sugar content of the sap. The syphon 202 is then installed between large basins 100*a* and 100*b* to communicate the preheated and boiled sap to the second basin 100*b*, where the container 208 is installed, for a second stage of boiling to increase the evaporation of water.

Maple sap boiling and/or maple syrup production typically involve several boiling stages in order to refine the maple sap at each stage to ultimately produce concentrated maple syrup. Each stage may require different heat intensity. In this embodiment, the burners 38 of the heating compartment 18 enable for selective heating intensity, for example a high heating intensity for burners located under large basin 100*a* to preheat and boil at a first stage the maple sap whereas, burners located under large basin 100*b* could be set to a lower intensity heating for the second stage of boiling. Once the maple sap has boiled down and reached a predetermined temperature, it can then be transferred to a final boiling container (not shown) for a final boiling stage which can happen over a kitchen stove or simply by removing syphon 202 to prevent further maple sap to enter second basin 100*b* and better control the density of the syrup contained therein.

Although in the illustrated embodiment, the maple sap boiling kit 200 only includes two large basins 100*a*, 100*b*, in an alternative embodiment more than two large basins could be used depending on the size of the heating compartment of the gas barbecue 2, therefore improving and optimizing the different boiling stages by adjusting the heating intensity of the burners to collect a more refined maple syrup. Although in the illustrated embodiment the large basins used in the maple sap boiling kit 200 have a generally flat bottom wall, they could comprise a crenelated bottom or heat transfer fins in order to increase the heat transfer, as known in the art.

Turning now to FIGS. 12 to 16, a third embodiment of an add-on component 300 will now be described. In this embodiment, add-on component 300 is a flat basin. Like large basin 100, the flat basin 300 has a generally rectangular shape and, is adapted to be received in the heating compartment 18 on upper step components 56*a*, 56*b*. Flat basin 300 comprises a bottom wall 302, a lower end 304, an upper end 306 and pairs of side walls 308 and 310 extending from the lower end 304 to the upper end 306 and defining a main cavity 312, shallower than the main cavity 116 of the large basin 100.

The lower end 304 of side walls 308, 310 comprises a lower inclined portion 314 extending upwardly from the bottom wall 302, whereas, the upper end 306 of side walls 308, 310 comprises a vertical portion 316 and, like large basin 100, an outward extending lip 318. The outward extending lip 318 extends around the entire edge of the flat basin 300 and comprises a flat portion 320 and a vertical downward portion 322 comprising a lower end 324.

Figure 14:
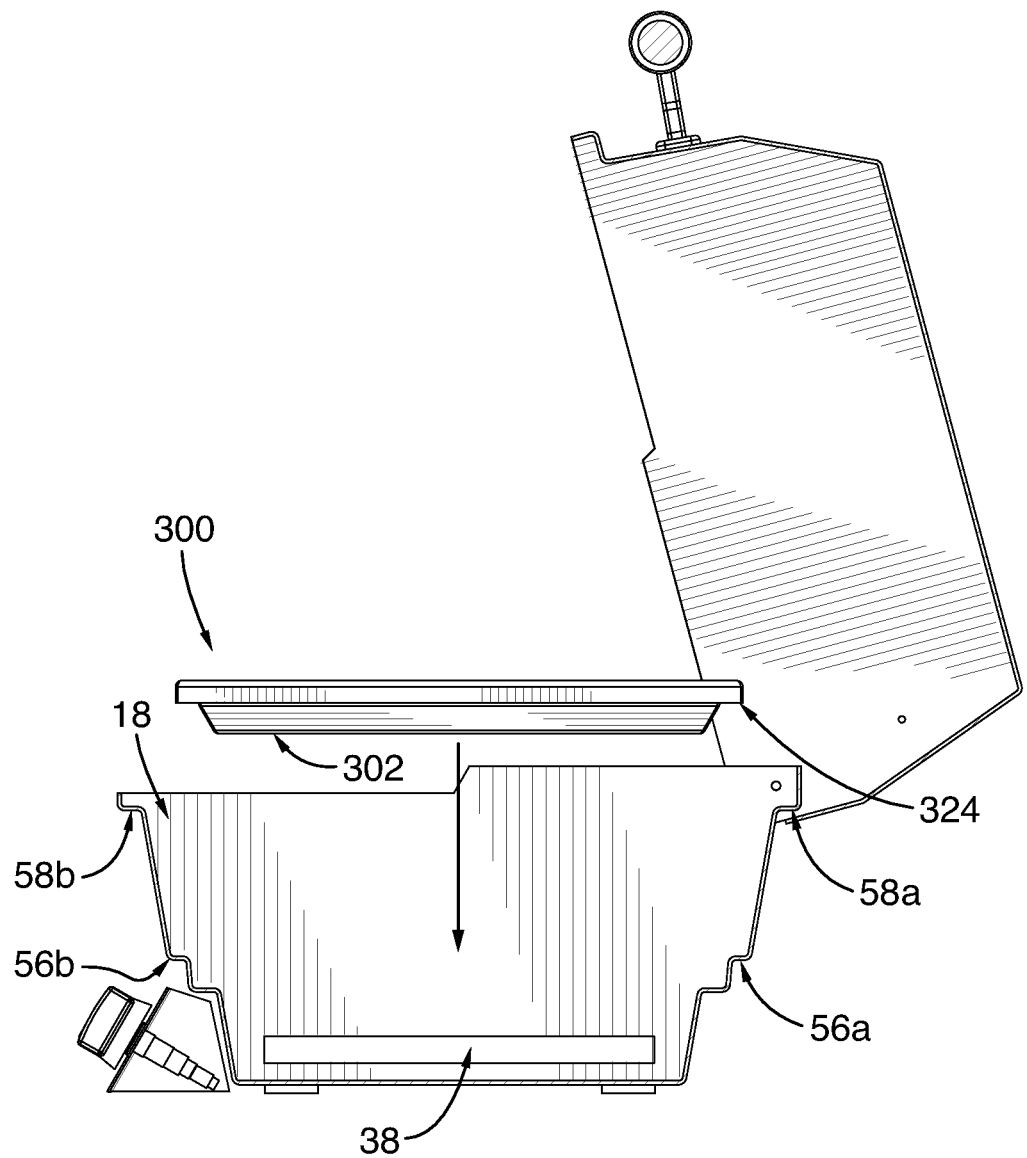
FIG. 14 is a right side cross-sectional view of the flat basin of FIG. 12 to be positioned in the heating compartment of FIG. 3.
Figure 15:
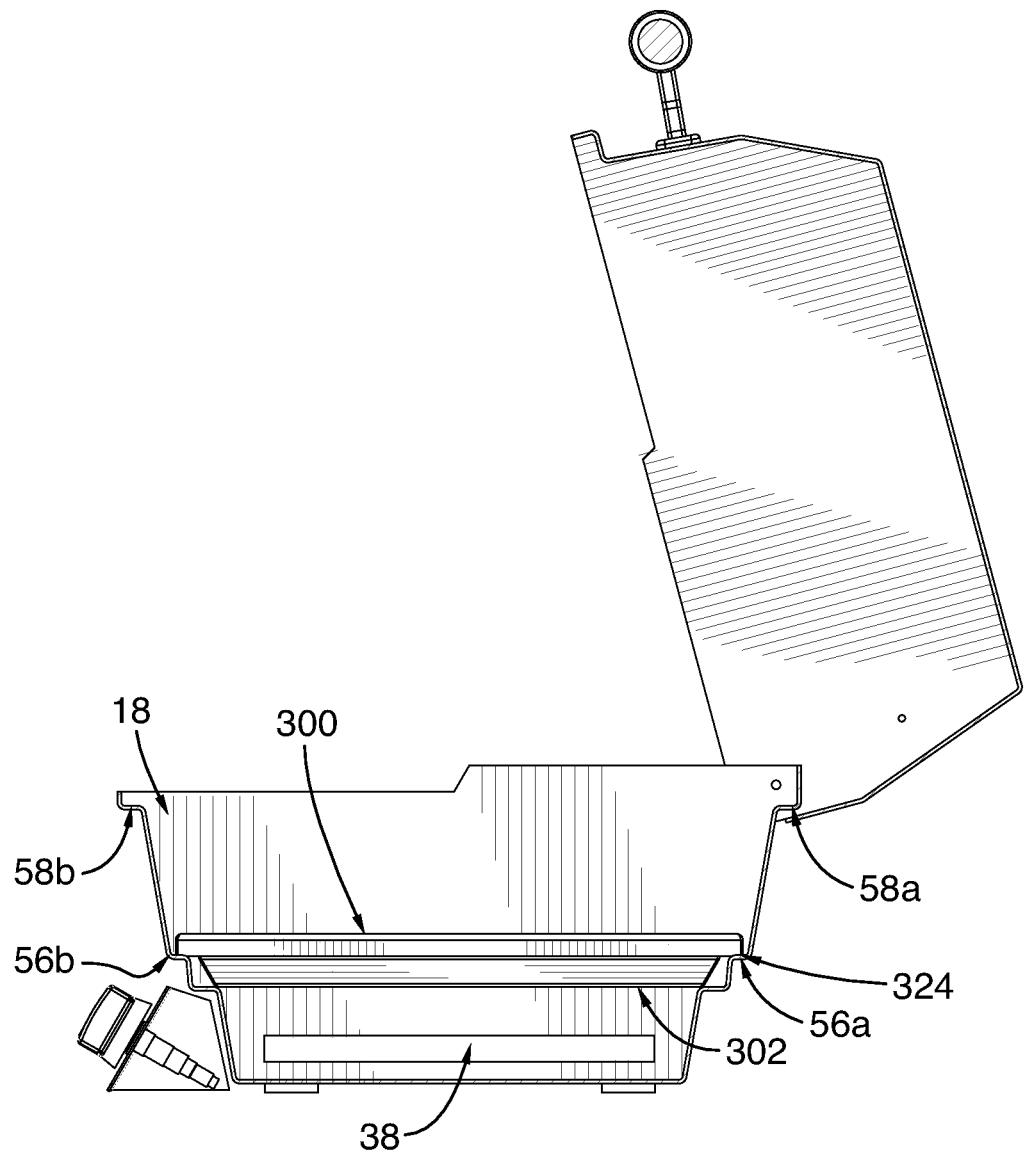
FIG. 15 is a right side cross-sectional view of the flat basin of FIG. 12 positioned in the heating compartment of FIG. 3.
Figure 16:
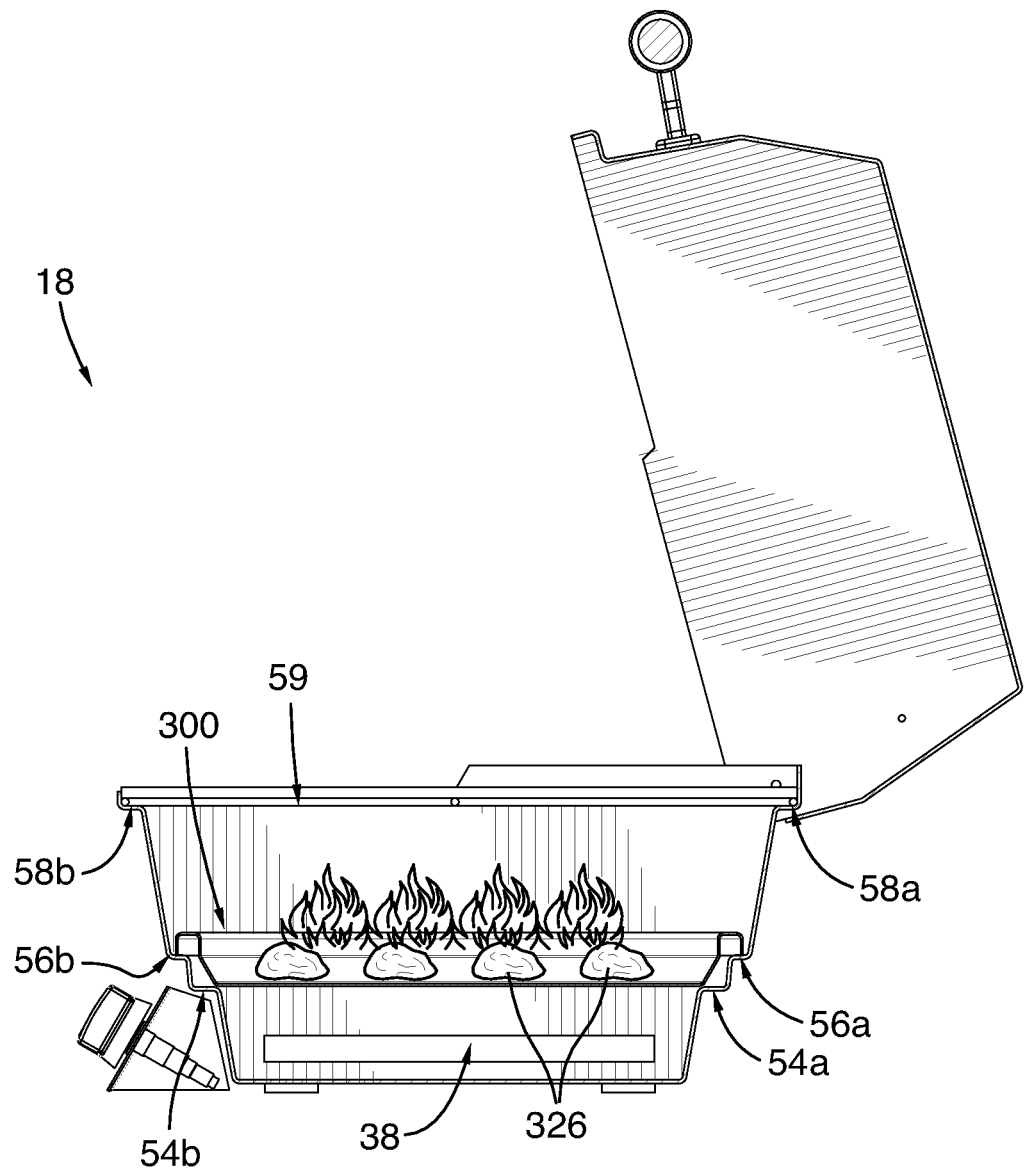
FIG. 16 is a right cross-sectional view of a kit for coal fire cooking.

As shown in FIGS. 14 to 16, the installation of the flat basin 300 in the heating compartment 18 is accomplished by removing the deflectors or heat plates located over the burners 38 (not shown) as well as the main cooking grid 59. Like large basin 100, the flat basin 300 is then placed in the heating compartment 18 but given the difference in shape, the flat basin 300 is configured to rest horizontally on the upper step components 56*a*, 56*b* thanks to the lower end 324 of the lip 318 abutting the step components 56*a*, 56*b* as shown in FIGS. 15 and 16. Once installed, the bottom wall 302 of the flat basin 300 is at an optimal distance from the burners 38, substantially similar to the distance of the bottom wall 102 of large basin 100 from the burners 38, when the large basin 100 is positioned on the lower step components 54a, 54b of the heating compartment, thus allowing for an optimized and improved heat exchange between the burners 38 and the flat basin 300. The flat basin 300 can therefore receive food directly on its surface to be cooked as in plate cooking (e.g. eggs, bacon, vegetables and the like).

In an alternative embodiment, the flat basin 300 enables the gas barbecue 2 to be converted into a charcoal barbecue, as shown in FIG. 16. In this embodiment, flat basin 300 is placed in the heating compartment 18 and charcoal briquettes 326 are then placed in the main cavity 312. As the burners 38 are ignited and the charcoal starts to heat, creating charcoal embers, a user will therefore know that the correct charcoal temperature has been reached. At this point, the user must turn off the fuel source, for instance the propane tank, by actuating the knobs 28 in order to close the fuel feed to the burners 38 and by closing the feed valve located on the fuel tank. The gas barbecue has therefore been converted into a coal barbecue, thus allowing for coal fire cooking. The main grid 59 can then be installed on step components 58a, 58b of the heating compartment 18 and food can then be disposed thereon to be cooked. The person skilled in the art will appreciate that instead of using the heat source of the barbecue grill 2 (i.e. burners 38a-38d) to ignite the charcoal, for instance electric igniters and starter combustibles.

In a further embodiment, a plurality of flat basins 300 could be positioned side-by-side in the heating compartment 18, depending on the size of the barbecue. Therefore, each flat basin 300 could provide for a different cooking method. For example a first flat basin could be used for plate cooking while a second flat basin could be used for coal fire cooking. In this configuration, a grid smaller than the main grid 59 of the barbecue 2 (e.g. about half the width of grid 59) would be positioned over the second flat basin to dispose food thereon, thus leaving access to the first flat basin. In a further alternative embodiment, the flat basin 300 enables converting barbecue grill 2 into a smoker to achieve smoke cooking by combining the flat basin 300 with a perforated plate system 600, which will be described in greater detail.

Figure 17:
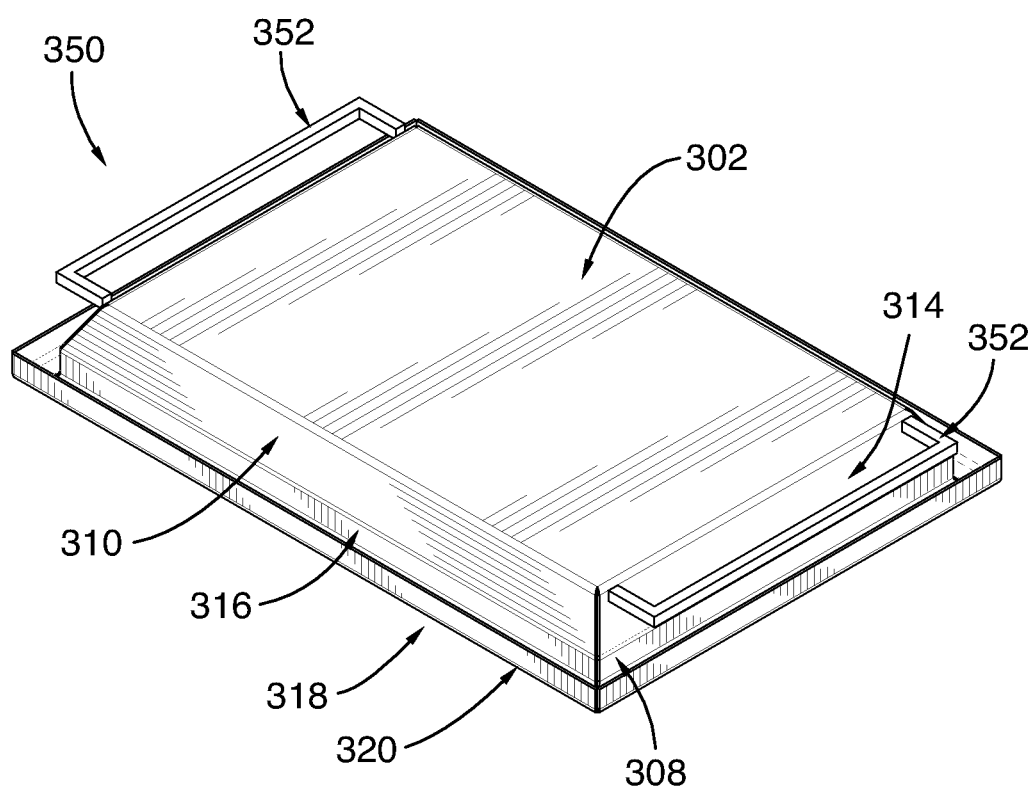
FIG. 17 is a perspective view of a lid.

With reference to FIG. 17, a lid 350 designed to cover the large basin 100 for enabling food to be cooked in a closed container such as in braising, will now be described in accordance with a preferred embodiment. The lid 350 has the same overall shape and the same features as the flat basin 300 such as the outward extending lip 318, the lower inclined portion 314 and upper vertical portion 316 of the side walls 308 and 310, but the lid 350 is deeper than the flat basin 300, to provide clearance for handles 418 of perforated flat basin 400 as it will be explained further, but shallower than large basin 100. The lid 350 further comprises a pair of handles 352 located on the lower inclined portion 314 of the side walls 308, flush with the bottom wall 302. The handles 352 can either be welded or removably secured to the lid 350 by any suitable technique known to a person of skill in the art. The handles 352 allow for a user to carry and/or manipulate the lid 350 to cover the large basin 100 as it will be explained further.

Although in the illustrated embodiment, the lid 350 is shown covering the large basin 100, the lid 350 can also be used to cover other add-on components such as the flat basin 300 or the perforated flat basin 400, as it would be apparent for a person of skill in the art. Furthermore, in an alternative embodiment, the lid 350 can be flipped over and can be used in the same manner as the flat basin 300. In this configuration, the lid 350 can be placed in the heating compartment 18 of the gas barbecue and by abutting the handles 352 onto the step components 56a, 56b or onto the step components 58a, 58b therefore modifying the distance between the lid 350 and the burners 38 to optimize the heat transfer according to different cooking methods. Therefore, the lid 350 can alternatively become an add-on component, like flat basin 300, adapted to receive food or ingredient in its main cavity to be cooked as in plate cooking.

In an alternative embodiment, the handles 352 of the lid 350 could be located on the lower inclined portion 314 of the side walls 310 and flush with the bottom wall 302. Alternatively, the handles 352 could be located on the lower inclined portion 314 of all the side walls 308, 310 and flush with the bottom wall 302.

Figure 18:
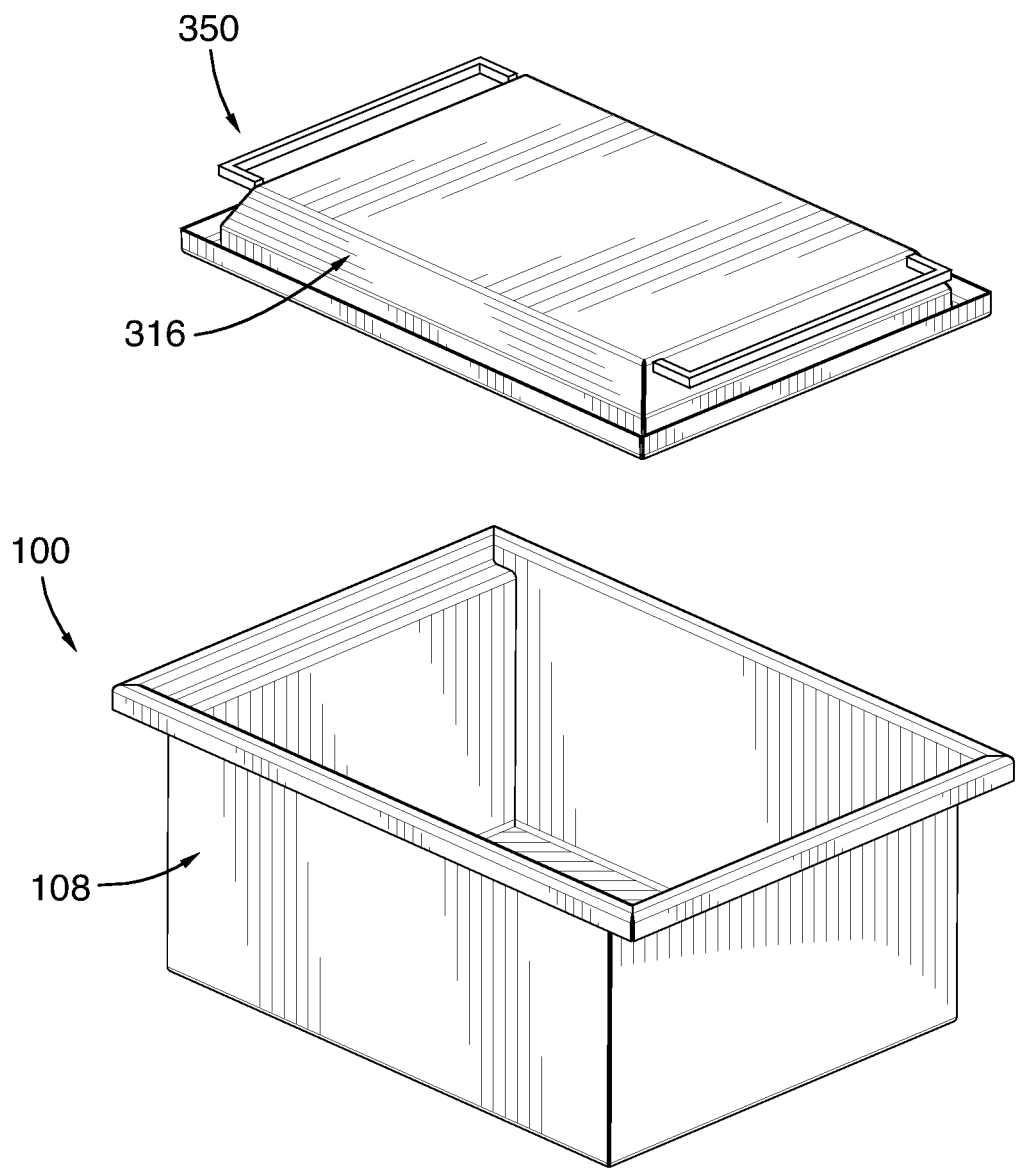
FIG. 18 is a exploded perspective view of a lid and a large basin.
Figure 19:
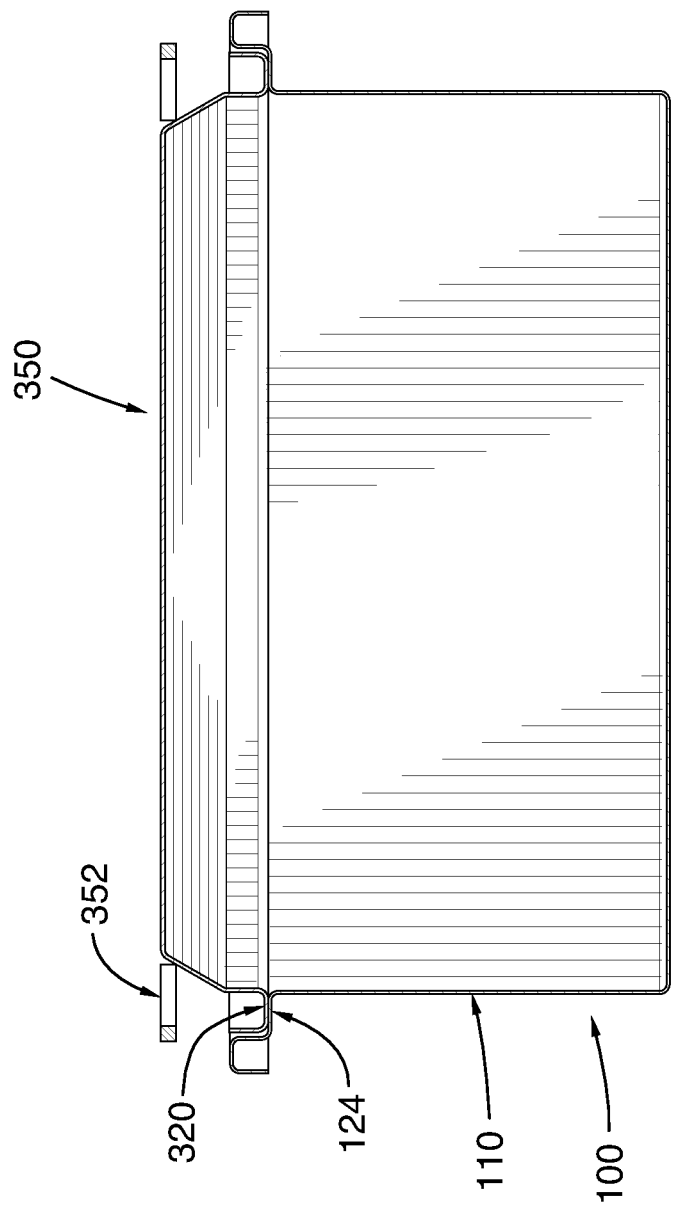
FIG. 19 is a front cross-sectional view of the lid assembled on the large basin.

With reference to FIGS. 18 and 19, the large basin 100 and the lid 350 are combined for braising. Once the large basin 100 is installed in the heating compartment 18, food, ingredients or liquids are placed in the main cavity 116 of the large basin 100. The lid 350 is subsequently installed on top of the large basin 100 by aligning in parallel its side walls 310 with the vertical walls 108a, 108b of the large basin 100 and by abutting the flat portion 320 of the outward extending lip 318 of the side walls 308 onto the outward extending step 124 of the large basin 100 as shown in FIG. 19. In such a configuration, the heat concentration is maximized in the large basin 100 thanks to the lid 350.

Figure 20:
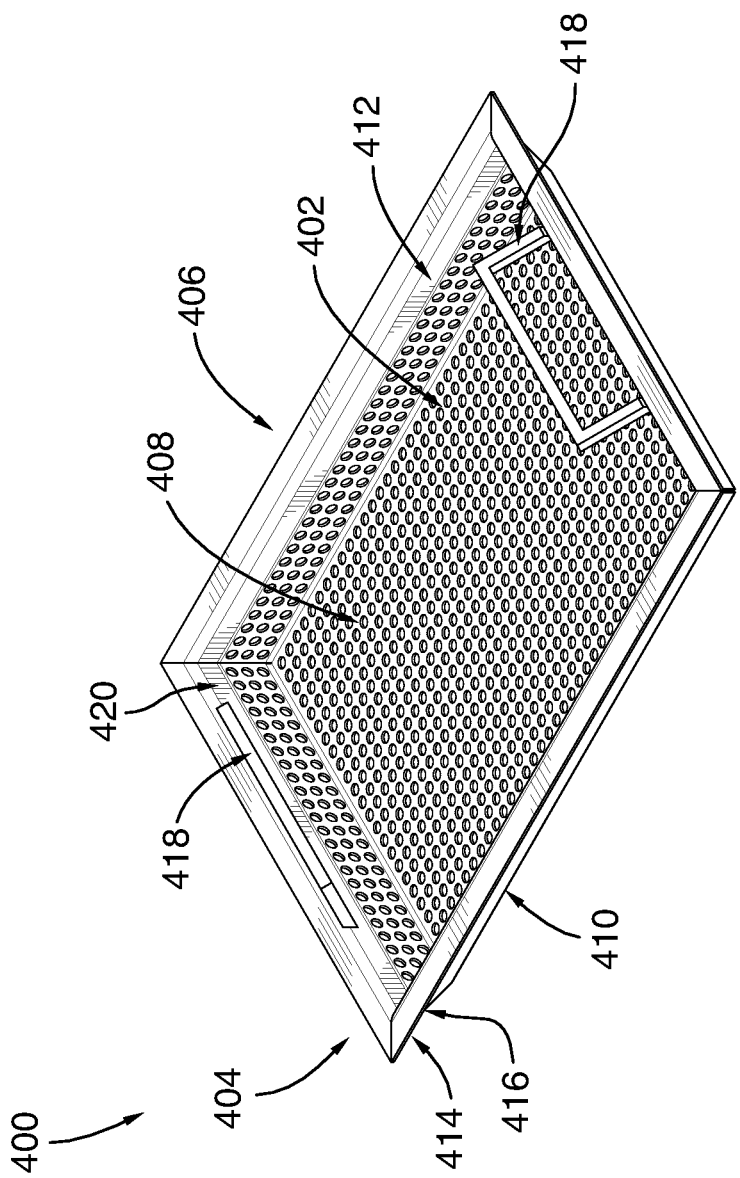
FIG. 20 is a perspective view of a second embodiment of a flat basin.
Figure 21:
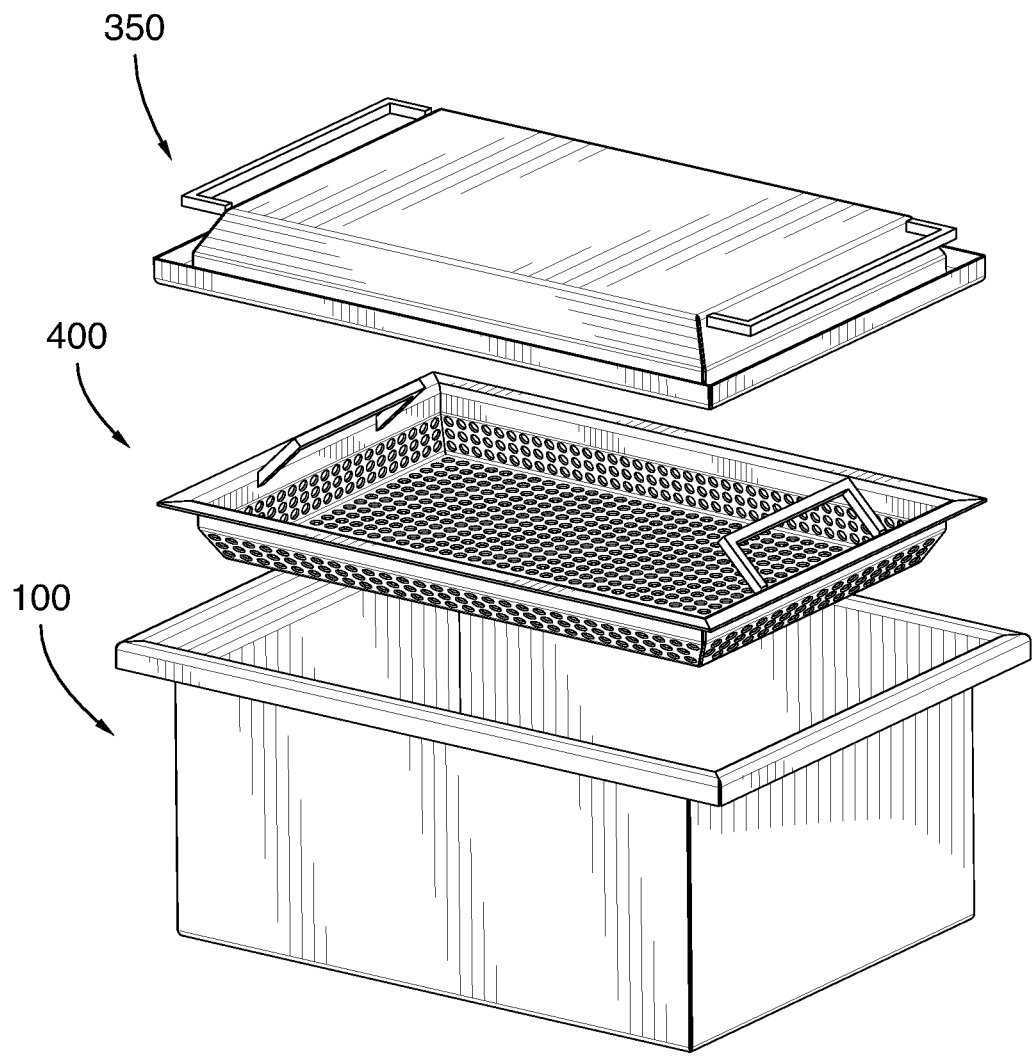
FIG. 21 is an exploded perspective view of a steam cooking kit including the large basin of FIG. 5, the second embodiment of the flat basin of FIG. 20 and the lid of FIG. 17.
Figure 22:
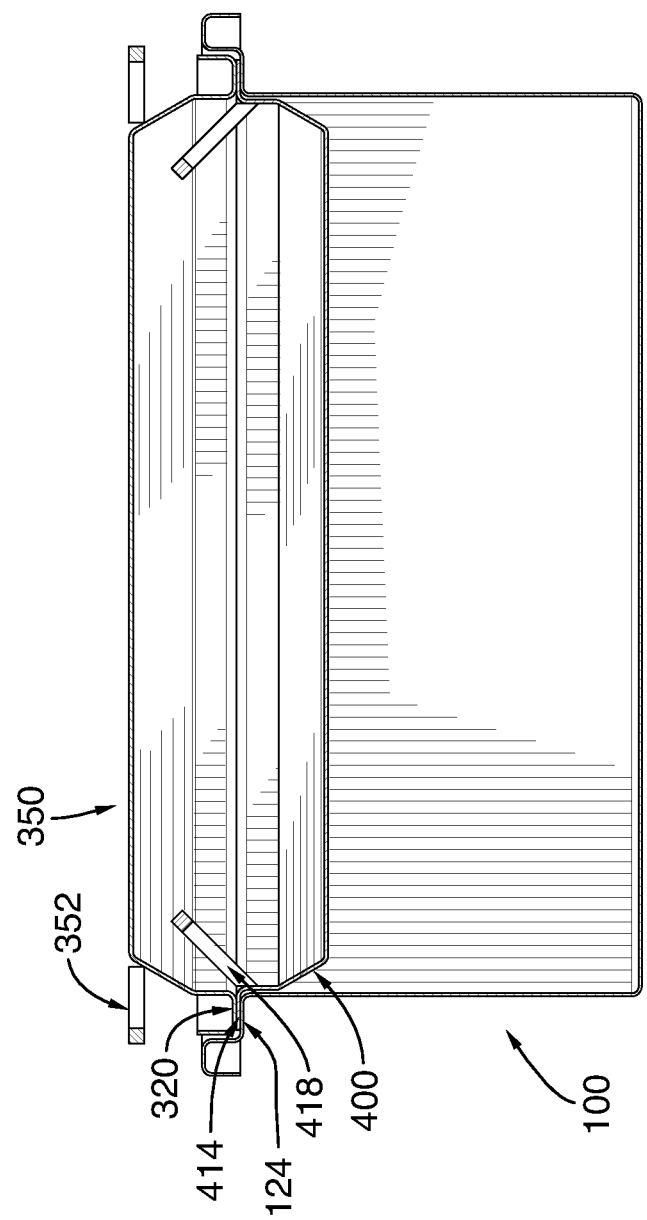
FIG. 22 is a front cross-sectional view of the steam cooking kit.

Turning now to FIGS. 20 to 22, an embodiment of a perforated flat basin 400 will now be described. In this embodiment, perforated flat basin 400 is a small strainer, sized and shaped to be received in large basin 100, and to receive lid 350 but can also be positioned on the upper step components 56a, 56b of the heating compartment 18 like flat basin 300. As such, the combination of perforated flat basin 400, large basin 100 and lid 350 enables the conversion of the barbecue grill 2 into a steam cooking device.

In this embodiment, perforated flat basin 400 has generally the same overall shape as flat basin 300 and comprises a perforated bottom wall 402, perforated side walls 404, 406, defining a main cavity 408, an inclined lower portion 410 of side walls 404, 406 and a vertical upper portion 412 of side walls 404, 406. Contrary to flat basin 300, perforated flat basin 400 does not comprise an outward extending lip but instead comprises an outward extending flat edge 414 having a lower surface 416 adapted to abut step 124 of large basin 100 once received therein. Furthermore, perforated flat basin 400 comprises a pair of handles 418, obliquely installed and secured on the internal surface 420 of the vertical portion 412 of the side walls 404. The position of the handles 418 is adapted to avoid interference with the lid 350 when lid 350 is positioned over the perforated flat basin 400 to be covered, as shown in FIG. 22. In this configuration the handles 418 of the perforated flat basin 400 are received in the main cavity of the lid 350, without any obstruction. The handles 418 allow a user to carry and/or manipulate the perforated flat basin 400 in order to nest it in the large basin 100 or to install it in the heating compartment 18.

In an alternative embodiment, handles 418 could be installed on the side walls 406 or on all the side walls 404, 406 for allowing a user to easily manipulate and/or carry the perforated flat basin 400.

To convert the barbecue grill 2 into a steam cooking device, the large basin 100 is filled with water and then positioned in the heating compartment 18 of the gas barbecue 2 and placed over the burners 38 (see FIGS. 21 and 22).

The perforated flat basin 400 is then nested in the large basin 100 by positioning the perforated flat basin 400 in the main cavity 116 of the large basin 100 thanks to handles 418 and by abutting the lower surface 416 of the flat edge 414 of the perforated flat basin 400 on the outward extending step 124 of the large basin 100. Food, ingredients or other solid objects can then be disposed in the main cavity 408 of the perforated flat basin 400 to be cooked, heated or steamed. Optionally, the lid 350 can be installed over the perforated flat basin 400 by placing the flat portion 320 of the outward extending lip 318 against the flat edge 414 of the perforated flat basin 400.

Turning to FIGS. 23 to 31, add on components 600 and 700 are configured to collaborate with flat basins 300 and 500 to convert the barbecue grill 2 into a smoker for smoke cooking.

Figure 23:
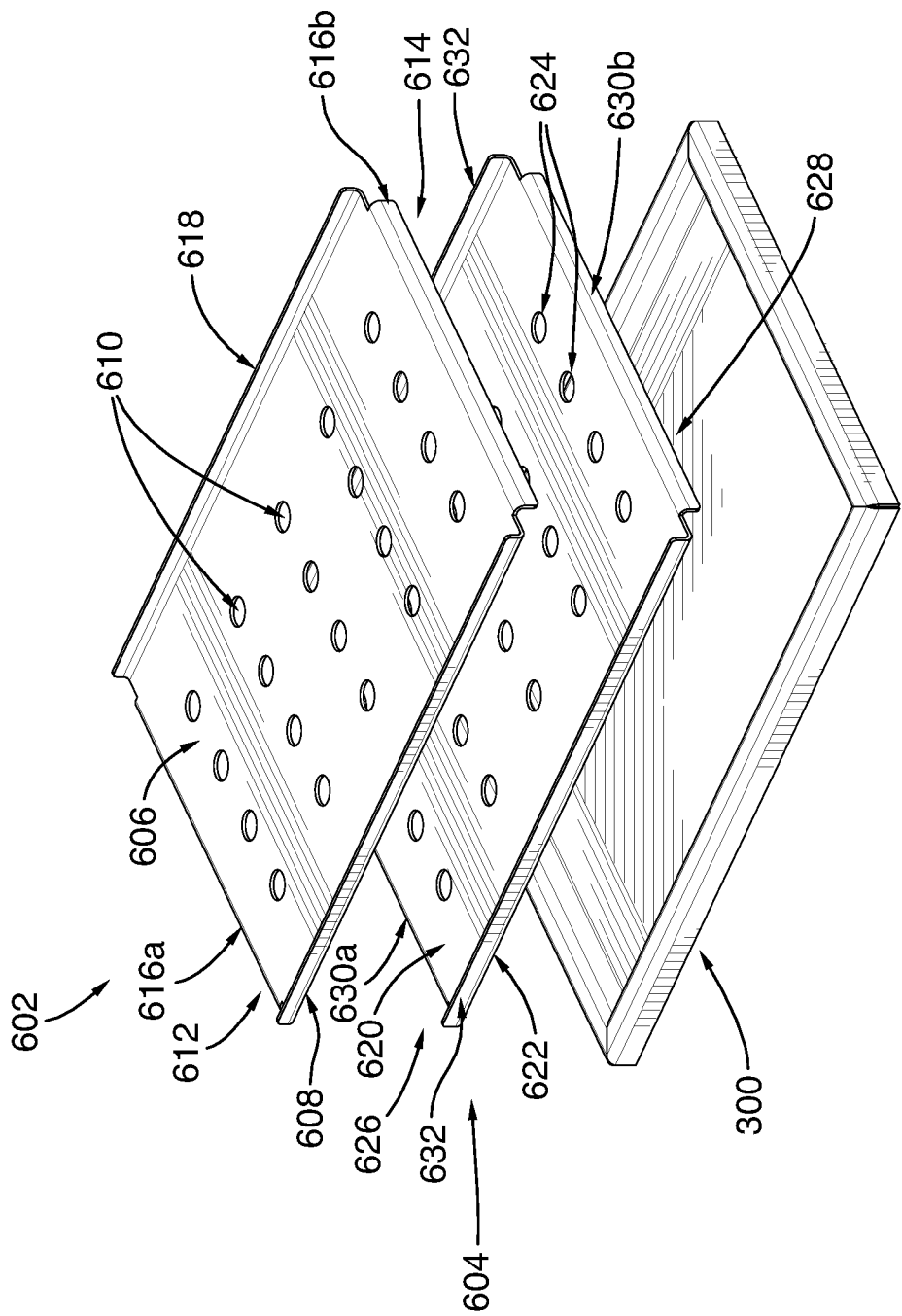
FIG. 23 is an exploded perspective view of a first embodiment of a smoke cooking kit including the flat basin of FIG. 12 and a first embodiment of a perforated plate system.
Figure 24:
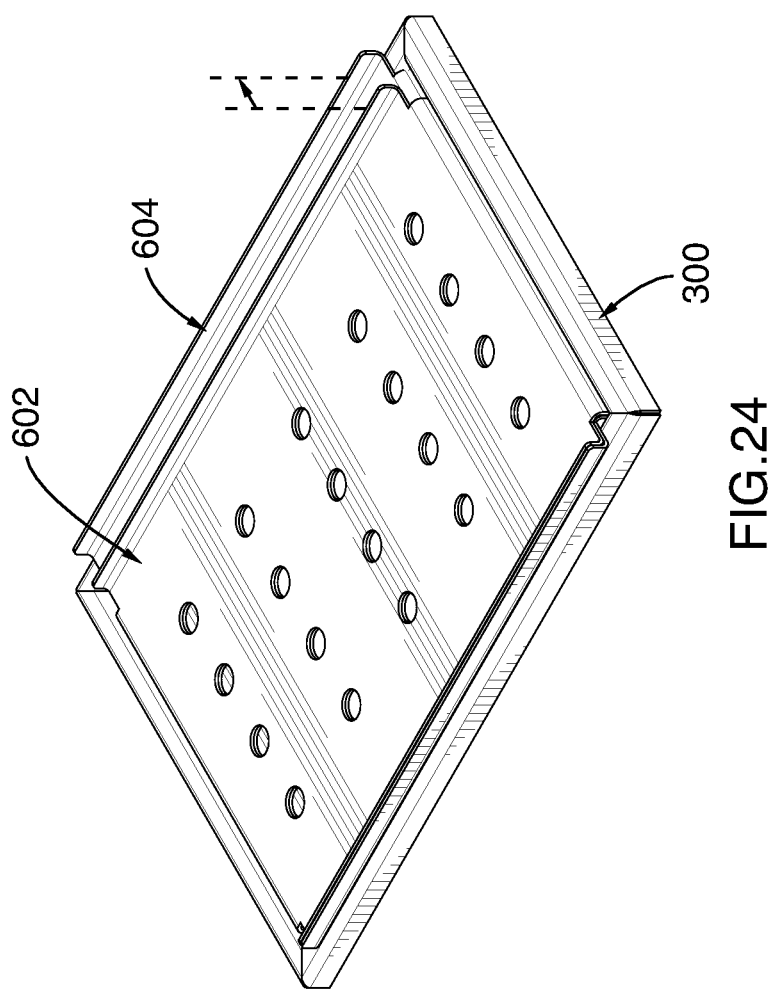
FIG. 24 is a perspective view of the smoke cooking kit of FIG. 23, with the perforated plate system in the open position.
Figure 25:
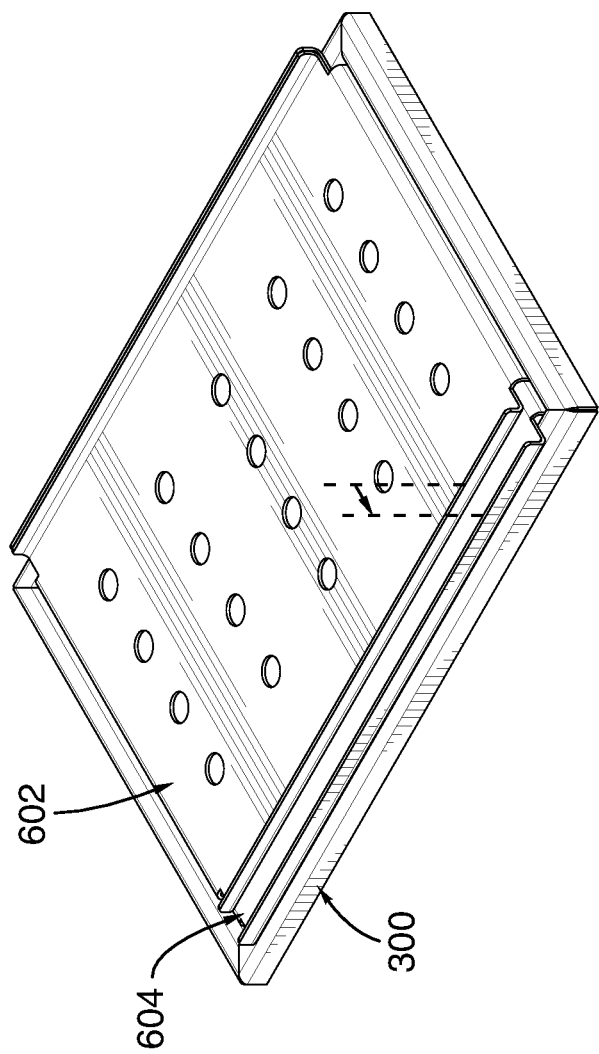
FIG. 25 is a perspective view of the smoke cooking kit of FIG. 23, with the perforated plate system in the closed position.

With reference to FIGS. 23 to 25, a preferred embodiment of a perforated plate system 600 used in conjunction with flat basin 300 will now be described. The perforated plate system 600 comprises two perforated plates 602 and 604, disposed one above the other, and allows plate 602 to overlap plate 604 during lateral movement to control the amount of smoke emanating from a plurality of holes during smoke cooking, as it will be explained further.

The perforated plate 602 comprises a generally rectangular shape having an external surface 606, an internal surface 608 and a plurality of holes 610 extending from the external surface to the internal surface. The perforated plate 602 further comprises a first end 612 and a second end 614 comprising downward extending lips 616a, 616b. The perforated plate 602 further comprises upward lips 618 extending vertically above the external surface 606.

Plate 604 has generally the same shape as the plate 602 and has an internal surface 620, an external surface 622 and a plurality of holes 624 extending from the external surface to the internal surface. The perforated plate 604 further comprises a first end 626 and a second end 628 comprising downward extending lips 630a, 630b. The perforated plate 604 further comprises upward lips 632, located on the right and left side of plate 604 and extending vertically upwardly from the internal surface 620. The distance between right and left lips 632 of plate 604 is greater than the distance between right and left lips 618 of plate 602 to allow plate 602 to move laterally relative to plate 604, as it will be explained further below. Furthermore, lips 632 of plate 604 act as stoppers when plate 602 is laterally moved over plate 604.

As shown in FIGS. 24 and 25, the perforated plate system 600 is associated with the flat basin 300 to provide smoke cooking. The flat basin 300 is filled with wood chips and positioned in the heating compartment 18 of the gas barbecue 2. The perforated plate system 600 is then assembled by positioning the internal surface 608 of perforated plate 602 on the internal surface 620 of the perforated plate 604 and the downward lips 616a, 616b of plate 602 on the downward lips 630a, 630b of plate 604, as it would be readily understood by a person of skill in the art. The perforated plate system 600 is fully functional when plate 602 is able to move laterally above plate 604 for controlling the amount of smoke coming out of the holes during smoke cooking, therefore converting the barbecue grill 2 into a smoker. As shown in FIG. 24, the perforated plate system 600 is in an open position when the holes of plate 602 and 604 are aligned. Plate 602 can laterally move within a predetermined length to overlap the holes of plate 604 to a closed position, as shown in FIG. 25, or intermediate positions (i.e. partially open positions) where the upward lips 632 of the plate 604 act as stoppers once the maximum lateral distance has been reached. The main grid 59 can then be positioned on step components 58a, 58b to receive food to be cooked by smoke cooking.

Figure 26:
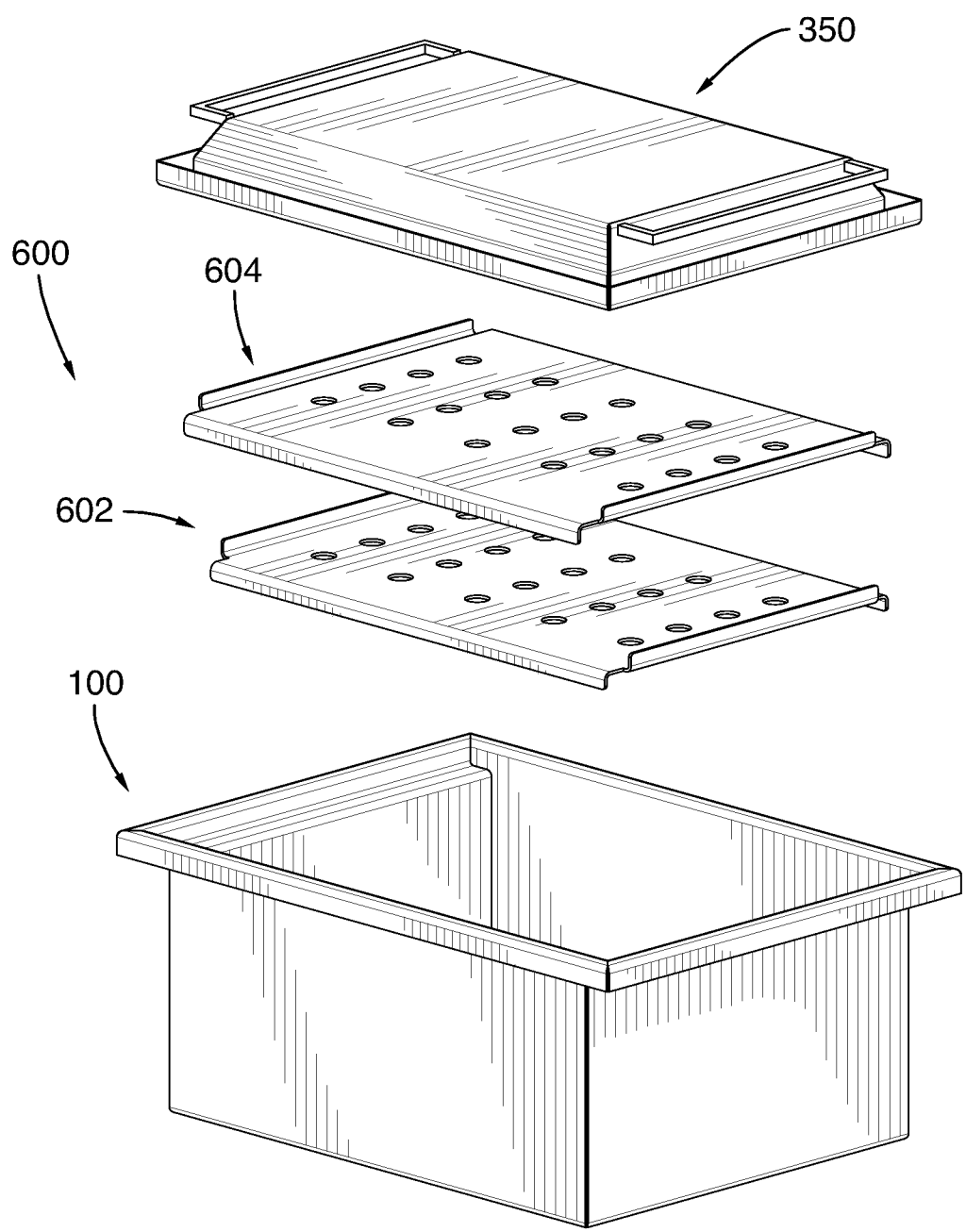
FIG. 26 is an exploded perspective view of a combination of add-on components including the large basin of FIG. 5, the perforated plate system of FIG. 23 and the lid of FIG. 17.
Figure 27:
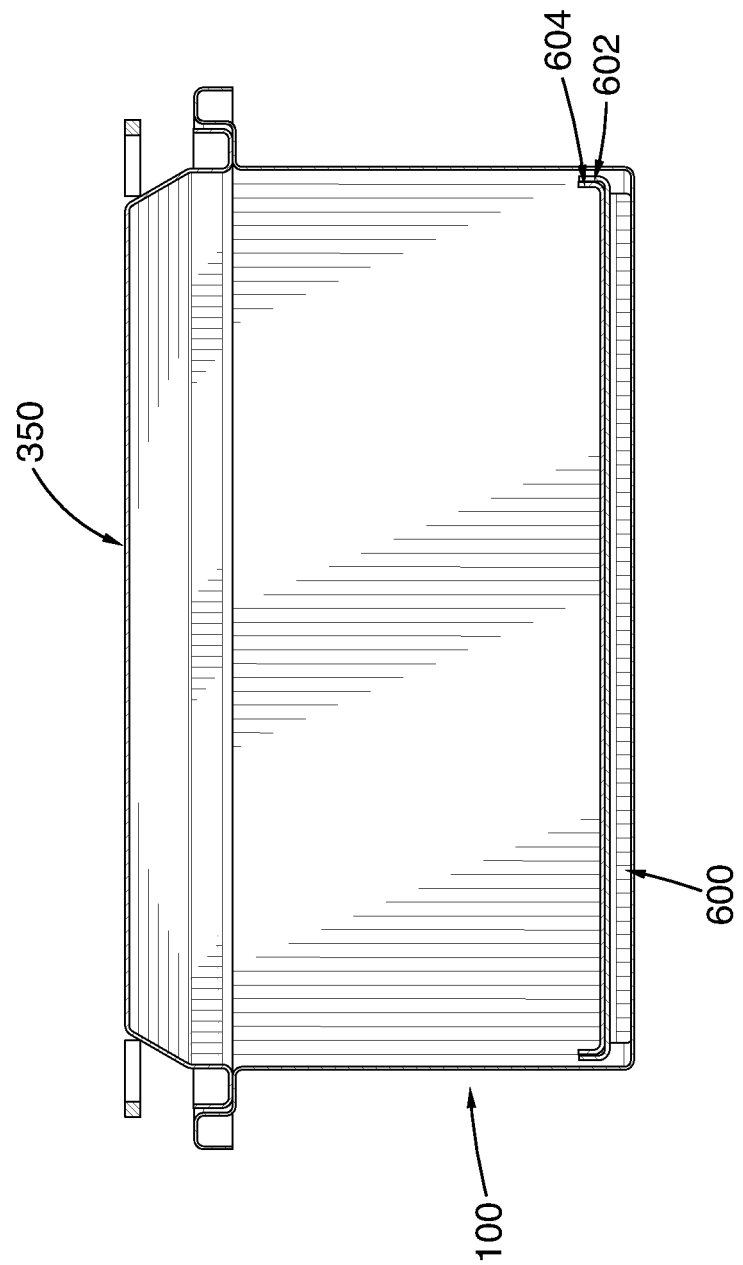
FIG. 27 is a front cross-sectional view of the add-on components of FIG. 26 once assembled.

With reference to FIGS. 26 and 27, the perforated plate system 600 combined with the large basin 100 and the lid 350 will now be described in order to obtain a cooking technique using the fumes from meat fat to avoid meat or poultry getting dry during cooking. In this embodiment, the large basin 100 is installed in the heating compartment 18 of the gas barbecue 2 as previously described. The perforated plate system 600 is then placed in the main cavity 116 of the large basin 100 by abutting the perforated plate 604 on the bottom wall 102. Food is then disposed on plate 602 to be cooked. The lid 350 is then installed on the large basin to maximize the heat concentration. This embodiment is comparable to braising but allows for food such as poultry to avoid having dry skin during cooking by allowing food fat to be trapped under the perforated plate system 600 thus enabling fumes from fat to emanate from holes 610, 624 to keep the meat tender during cooking. While in this embodiment perforated plate system 600 is used with barbecue grill 2, this and other add-on components 100 and 350 can be used with other heating devices. For instance, large basin 100 combined with the perforated plate system 600 and the lid 350 could alternatively be used in a conventional oven, as a roaster.

Figure 28:
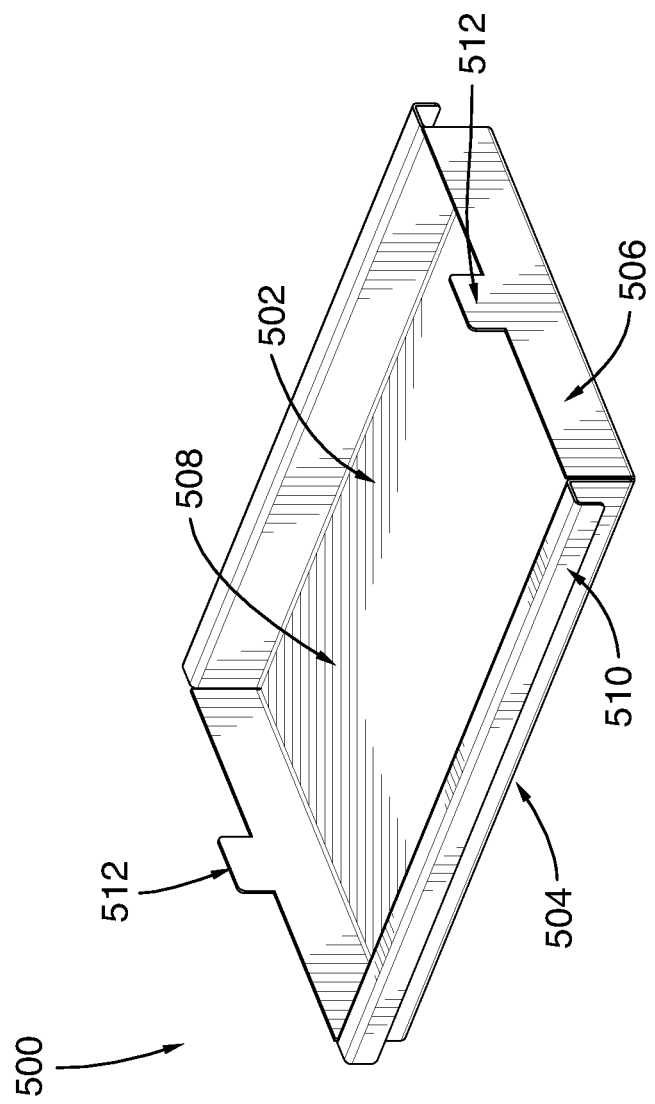
FIG. 28 is a perspective view of a third embodiment of a flat basin.

Turning now to FIG. 28, a third embodiment of a flat basin 500 will now be described. Like flat basins 300 and 400, flat basin 500 can be received on the lower step component 54a, 54b of the heating compartment 18 of the gas barbecue 2 or can be nested in the large basin 100. Flat basin 500 can enable a plurality of cooking techniques such as plate cooking, coal fire cooking, double boiling or smoke cooking. Also, like the previous flat basins 300 and 400, flat basin 500 has a generally rectangular shape and comprises a bottom wall 502. However, flat basin 500 differs from flat basins 300 and 400 in that it comprises pairs of parallel vertical walls 504, 506 defining a main cavity 508, shallower than the main cavity 116 of large basin 100.

The upper end of the vertical walls 504 comprises an outward extending lip 510 whereas, the upper end of the vertical walls 506 each comprises a laterally centered protrusion 512, extending vertically from the side wall 506 above flat basin 500 and designed to receive a perforated plate system 700 for smoking cooking, as it will be explained further.

Flat basin 500 can be combined with the large basin 100 to enable double boiling in order to heat food gently and gradually to fixed temperatures, or to keep food warm over a period of time. Furthermore, like flat basin 300, flat basin 500 can be directly placed in the heating compartment 18 of the gas barbecue 2 therefore allowing for either plate cooking or coal fire cooking. Flat basin 500 can alternatively be used to convert the barbecue grill 2 into a smoke cooking barbecue by combining the flat basin 500 with a perforated plate system 700, as it will be explained further.

Figure 29:
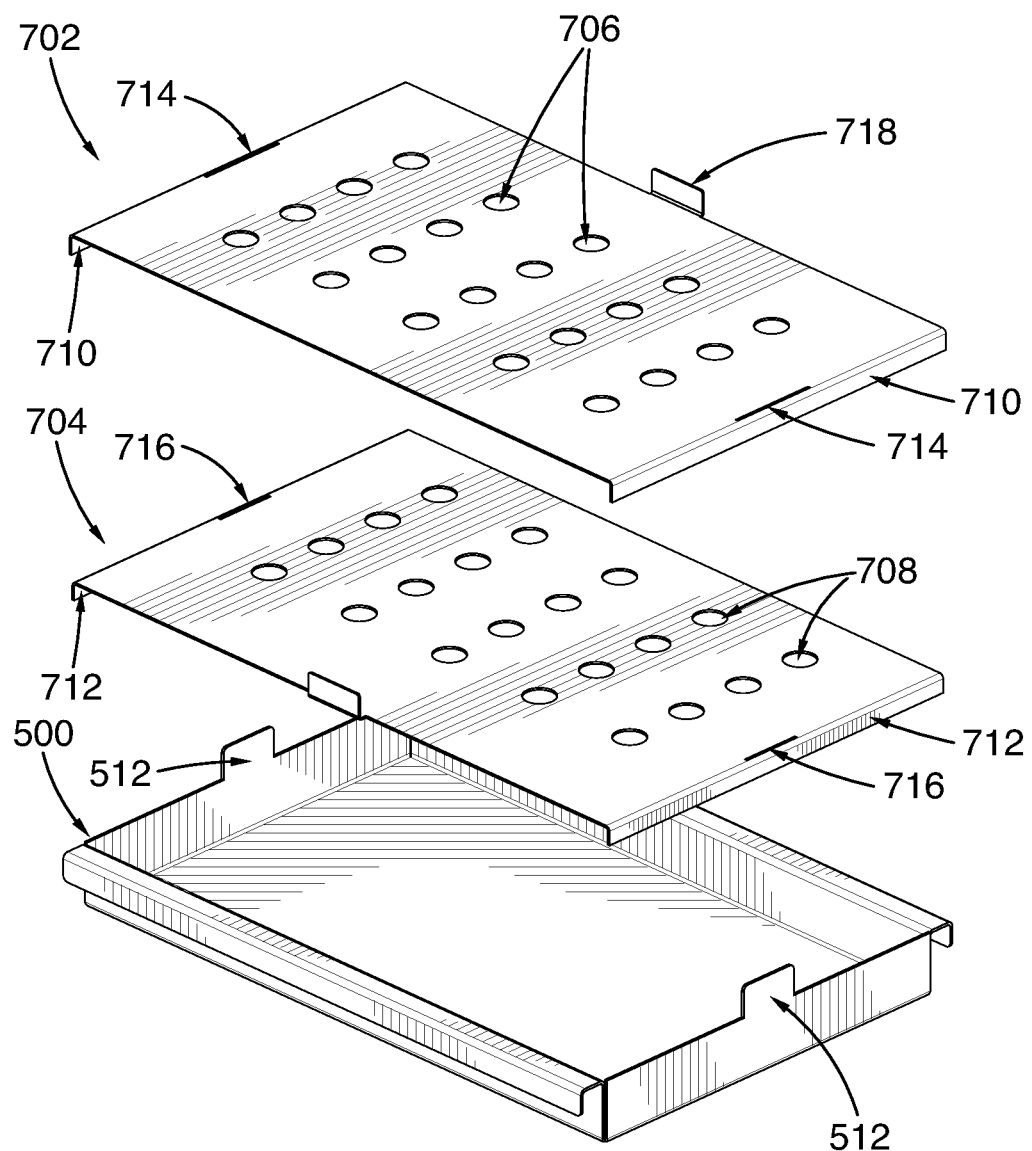
FIG. 29 is an exploded perspective view of a second embodiment of a smoke cooking kit including the flat basin of FIG. 28 and a second embodiment of a perforated plate system.
Figure 30:
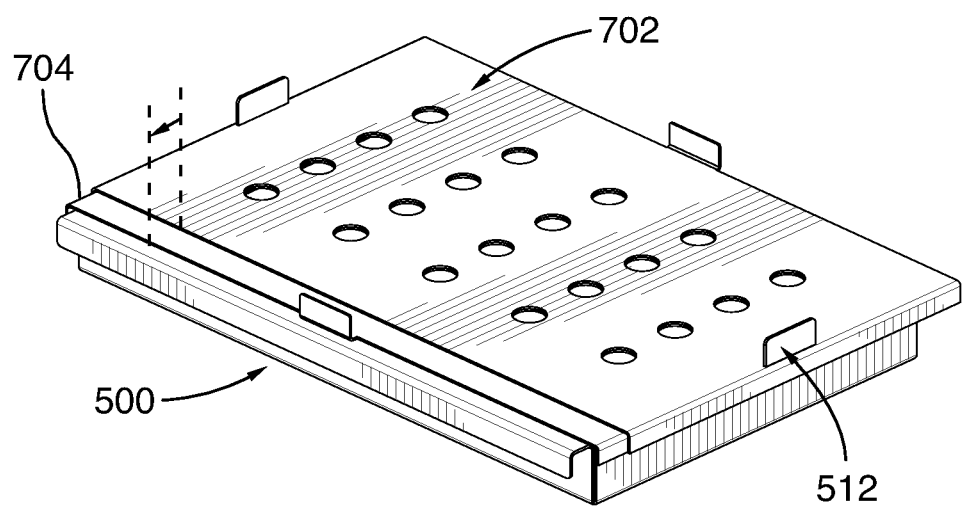
FIG. 30 is a perspective view of the smoke cooking kit of FIG. 29, with the perforated plate system in an open position.
Figure 31:
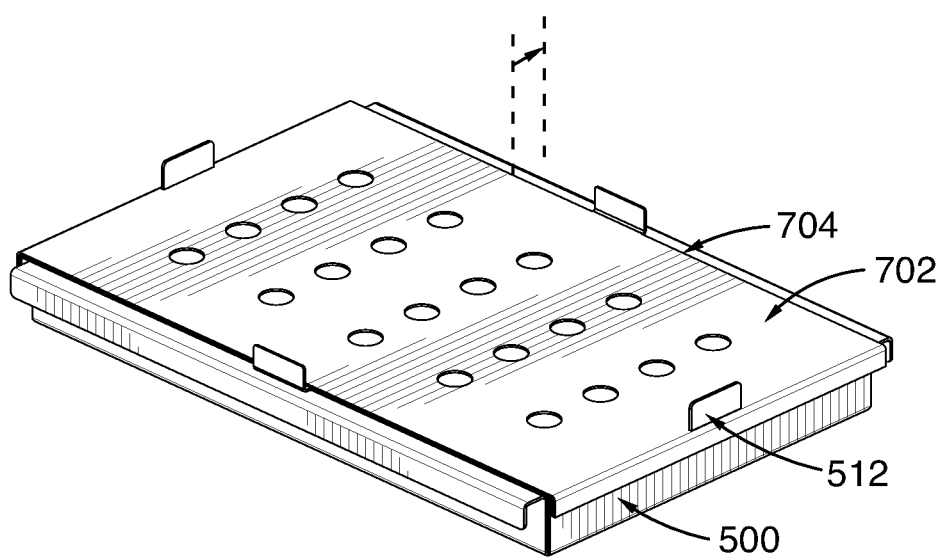
FIG. 31 is a perspective view of the smoke cooking kit of FIG. 29, with the perforated plate system in a closed position.

FIGS. 29 to 31 show an alternative embodiment of a perforated plate system 700 which can be combined with flat basin 500 for smoke cooking. Like the perforated plate system 600, perforated plate system 700 comprises two perforated plates, plate 702 adapted to move laterally relative to plate 704, having generally rectangular shapes and comprising a plurality of holes 706 and 708 extending the hole thickness of each plate. Plates 702 and 704 further comprise downward extending lips 710 and 712 and laterally extending holes 714, 716, located above lips 710 and 712. Hole 714 is longer than hole 716 and hole 716 has the same length and width as the protrusions 512 of the flat basin 500. Furthermore, plate 702 comprises a single vertical protrusion 718 extending vertically upwardly and located along its longitudinal side.

Like the perforated plate system 600 with the flat basin 300, the perforated plate system 700 can be combined with flat basin 500 to obtain smoke cooking. Wood chips are first disposed in the flat basin 500 and flat basin 500 is then installed in the heating compartment of gas barbecue. Plate 704 is then installed on flat basin 500 by aligning holes 716 with the protrusions 512. Plate 702 is then installed on top of plate 704 by also aligning holes 714 with the protrusions 512. Therefore, plate 702 is able to move laterally over plate 704 thanks to vertical protrusion 718 enabling a user to pull or push plate 702 over plate 704 and thanks to the holes 714 being longer than holes 716 and defining a maximum lateral length. Plate 702 can therefore laterally move from an open position where the holes 706, 708 are aligned, shown in FIG. 30, to a partially overlapped position, and to a closed position, shown in FIG. 31, where the holes 706, 708 are blocked. Plate 702 is laterally stopped when the vertical protrusion 512 abuts the end of holes 714.

In connection with all the above add-on components 100, 200, 300, 350, 400, 500, 600, 700 and combination thereof, the add-on components could alternatively have a square, circular, oval or any other shape for being placed in the heating compartment 18 or for being nested in the large basin 100. Furthermore, like large basin 100, flat basins 300 and 500 could be configured to removably receive removable adaptors to accommodate different sizes of heating compartments thus allowing horizontal positioning in a variety of different heating compartments of different gas barbecues.

Figure 32:
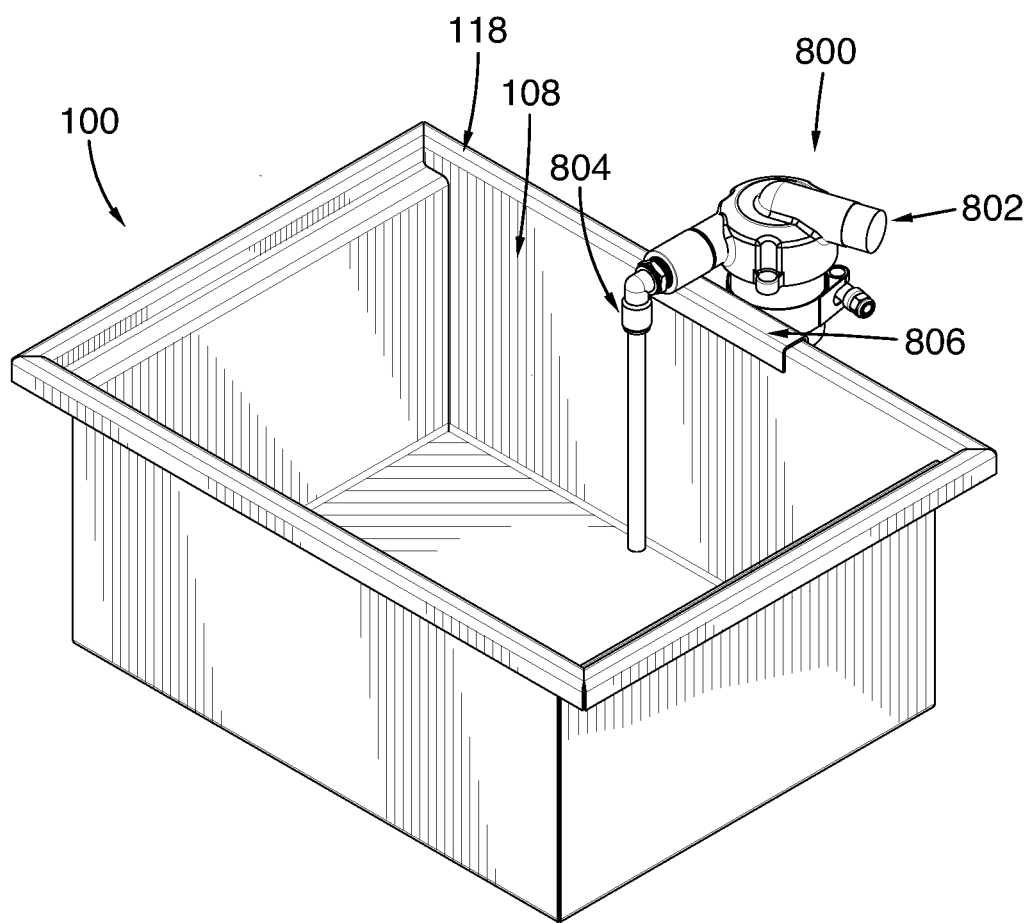
FIG. 32 is a perspective view of an embodiment of a water heating kit including the large basin of FIG. 5 and a pump.

With reference to FIG. 32, a kit for converting a gas barbecue into a water heater is provided. This kit is particularly useful for camping or outdoor activities in remote areas. During camping or vacation in remote areas, it can indeed be difficult to find hot water to either bath, make coffee or tea or even to wash dishes. Yet, gas barbecue such as barbecue grill 2 are often available. Therefore, in this embodiment, a large basin 100 is combined with a water pump 800 which is ordinarily either wired to an electrical source such as a plug in a car or is connected to a portable battery. The pump 800 comprises a water inlet 802, a water outlet 804 and a hook 806 enabling the pump 800 to be secured to either walls 108 or 110 of the large basin 100. The water outlet 804 of pump 800 is connected to a fluid circuit such as a pipe system for feeding an outdoor shower, a sink and the like. In this embodiment, the pump 800 can be actuated once the water contained in the large basin 100 is sufficiently heated, thus providing heated water to a user.

The large basin 100 having a rather significant main cavity 116, it allows for a user to wash the dishes by dipping them into the heated water. Furthermore, the hot water collected in the large basin could also be used for bathing especially in cold areas where hot water is scarce. As it can be understood for a person of skill in the art, many uses of this embodiment could be apparent without departing from the scope of the invention.

In an alternative embodiment, the pump 800 could be connected to a water or any suitable liquid source for filling the main cavity 116 of the large basin 100 thanks to a hose and could therefore fill automatically the large basin 100 with the conveyed water to be heated.

Figure 33:
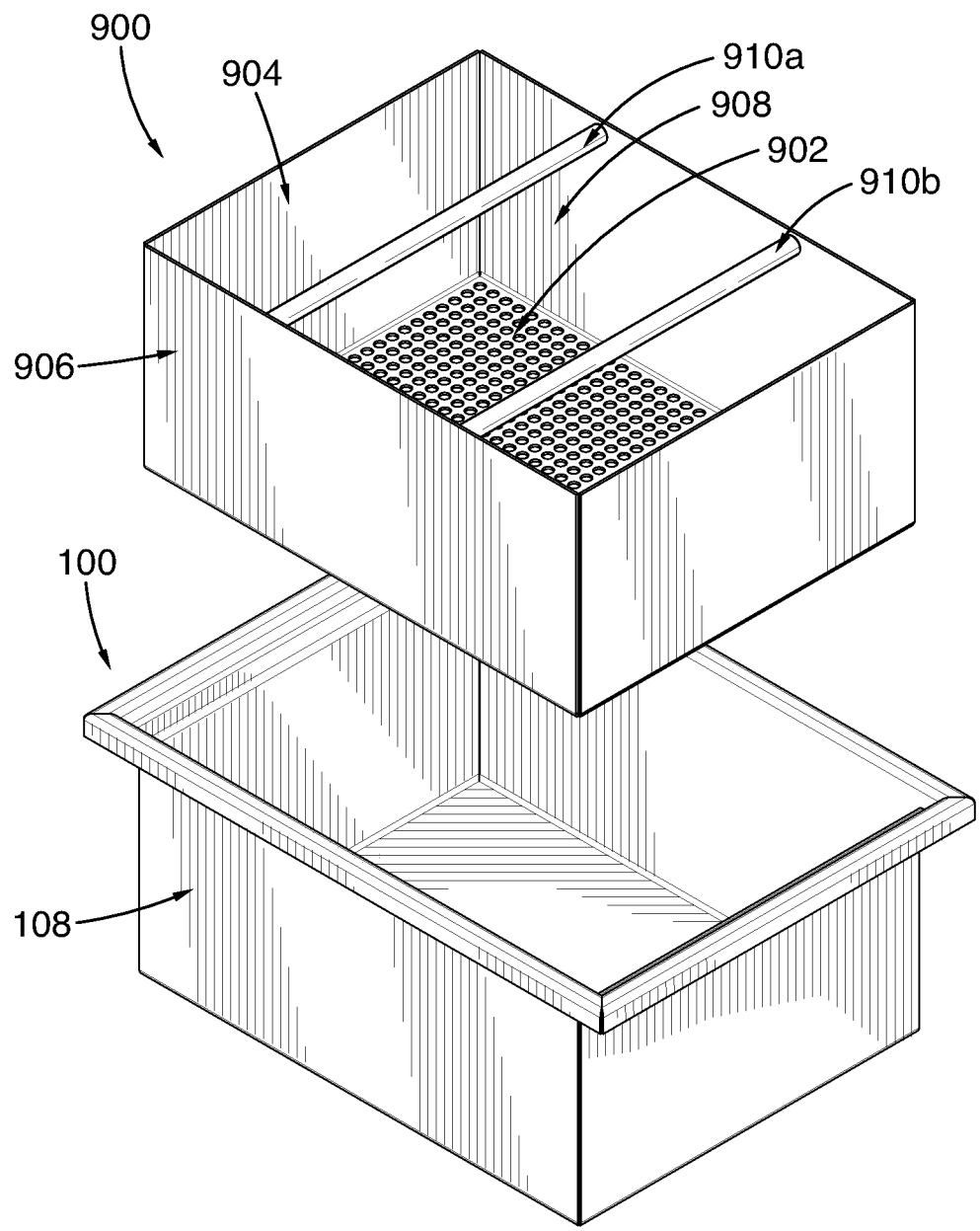
FIG. 33 is an exploded perspective view of an embodiment of a boiler kit, including the large basin of FIG. 5 and a strainer.
Figure 34:
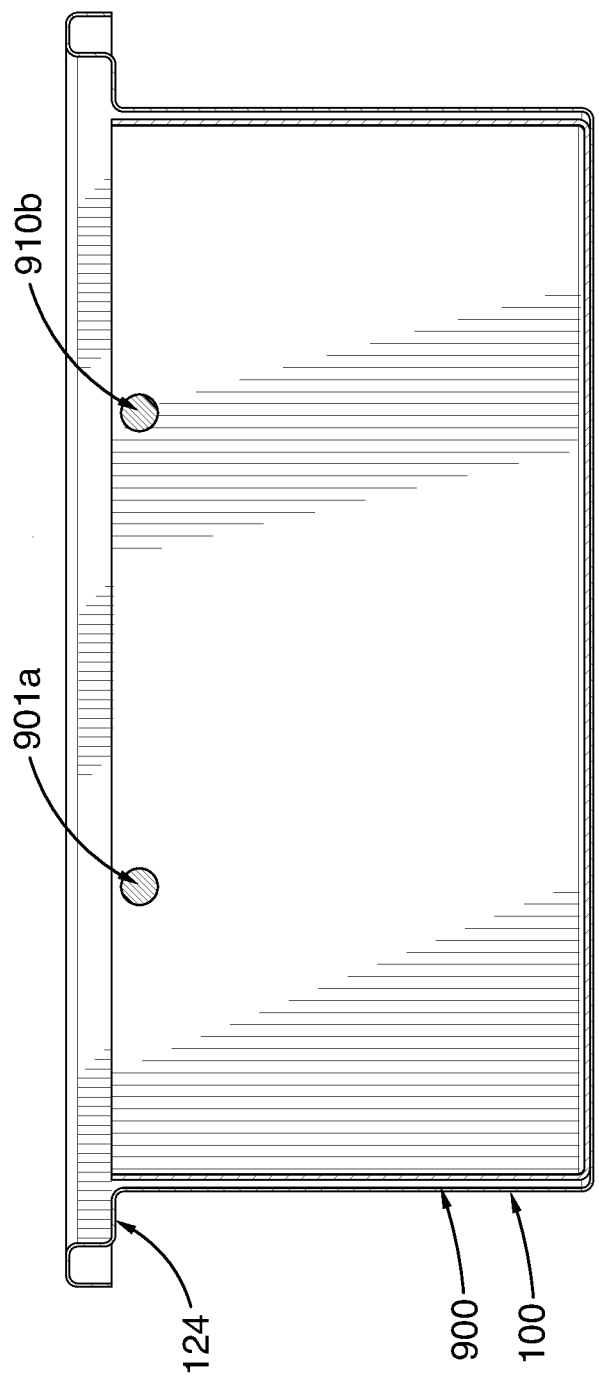
FIG. 34 is a front cross-sectional view of the boiler kit of FIG. 33 with the strainer positioned in the large basin.

With reference to FIGS. 33 and 34, a large basin 100 and a strainer 900 are combined to convert barbecue grill 2 into a boil cooking apparatus. In this embodiment, the strainer 900 has the shape of a hollow rectangular box adapted to be nested in the large basin 100 and can be made out of any suitable material such as aluminium, stainless steel or even plastic, silicone or ceramic. The strainer 900 comprises a bottom wall 902 comprising a plurality of holes, side walls 904 and 906 defining a cavity 908 where food is to be placed. The side walls 906 comprise two rods 910*a* and 910*b* disposed in parallel to side walls 904 to help a user grab and take out the strainer 900 from the large basin 100 once the cooking is finished. In an alternative embodiment, more than two rods 910*a*, 910*b* could be positioned longitudinally, parallel with side walls 904. Furthermore, rods 910*a*, 910*b* could be removable secured to the vertical walls 904, 906. While in the above embodiment the plurality of holes are defined only on bottom wall 902, side walls 904, 906 of the strainer 900 could also be provided with holes.

In order to convert the barbecue grill 2 into a boil cooking apparatus, the large basin 100 is first filled with water and placed in the heating compartment 18. Once the water reaches its boiling point, the strainer 900 containing the food, such as lobster or corn, is placed in the main cavity 116 of the large basin 100. In this configuration the upper end of the strainer 900 is flush with step 124 of the large basin 100 therefore enabling lid 350 to cover the strainer 900. Once the food is cooked, the lid 350 is removed and the strainer 900 is removed from the large basin 100 thanks to rods 910*a*, 910*b*.

It should be understood by a person of skill in the art, that depending on the size of the heating compartment 18, a plurality of cooking techniques involving the previously described add-on components 100, 200, 300, 350, 400, 500, 600, 700, 800 and 900 and combination thereof could take place simultaneously or sequentially therefore converting the modular barbecue system 1 into a smoke cooking apparatus, a double boiling apparatus, a steam cooking apparatus and so on.

In a first example, a flat basin 300 could be placed on the left side of the heating compartment 18 and could be used for plate cooking, a large basin 100 coupled with a perforated flat basin 400 and a lid 350 could be placed next to the flat basin 300 and could be used for steam cooking and a flat basin 300 coupled to a perforated plate system 600, placed next to the large basin 100, could be used for smoke cooking. Therefore, a small adaptable grid could be installed on the step components 58*a*, 58*b* of the heating compartment 18, over the smoke cooking combination to allow food to be received thereon and cooked.

In a second example, the modular barbecue system 1 could be used for plate cooking for a first user, it could then be used for smoke cooking by a second user, and it could then be used for receiving on the left side of the heating compartment 18, a large basin 100 combined with a strainer 900 and a lid 350 for boil cooking and on the right side of the heating compartment 18 an adaptable grid such as a telescopic cooking grid would be positioned on upper step components 58*a*, 58*b* for traditional grilling.

Furthermore, and as described above, the add-on components 100, 300, 400, 500, 600, 700 and any combination thereof, being made out of stainless steel in one embodiment, can also be placed in a conventional oven therefor enabling different cooking techniques such as the plate cooking, steam cooking, braising, roasting and so on.

It should also be understood for a person of skill in the art that modifications and adaptations are possible to adjust the accessories and add-on components to the size and shape of the gas barbecue.

Figure 35:
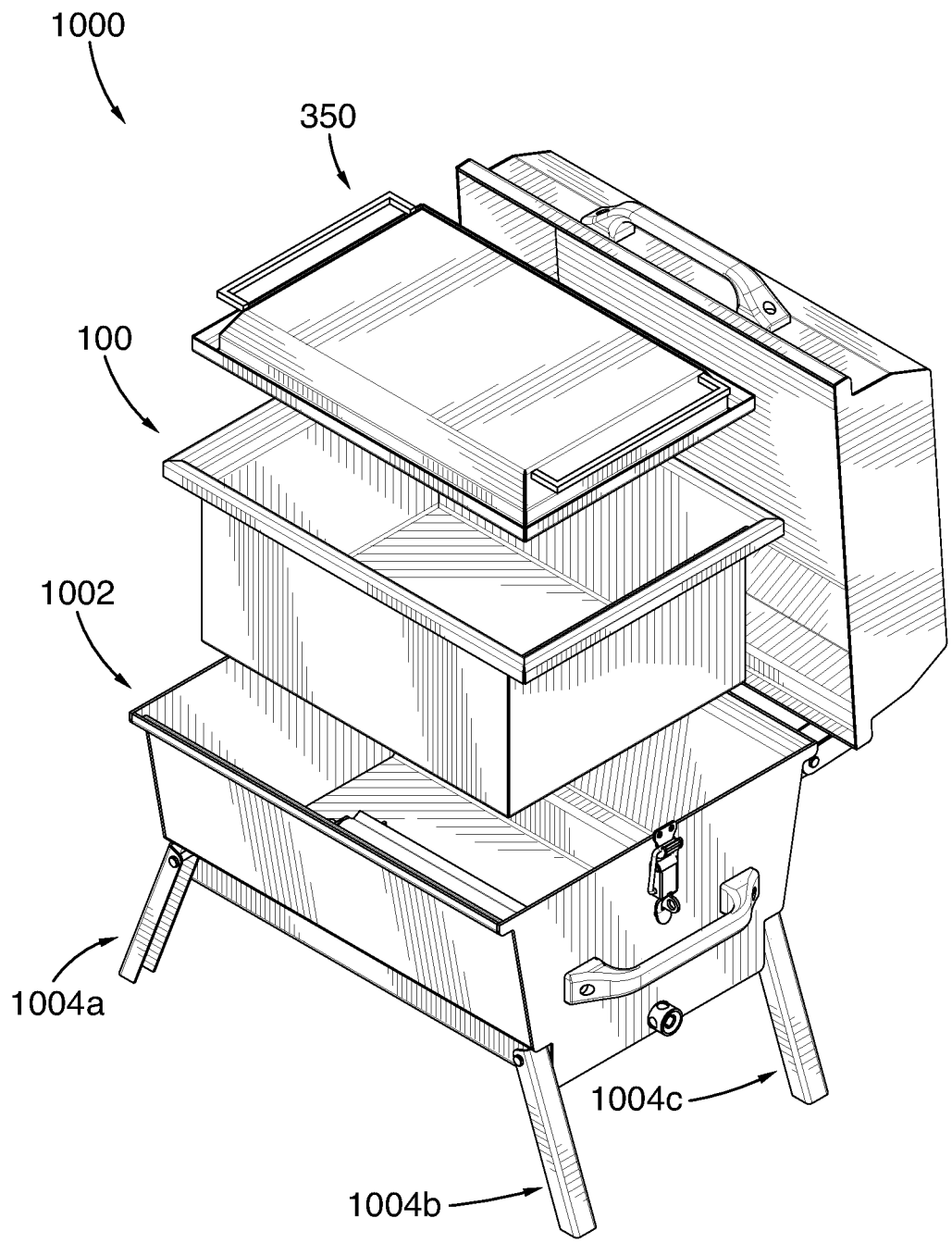
FIG. 35 is an exploded perspective view of an embodiment of a portable gas barbecue used in conjunction with the large basin of FIG. 5 and the lid of FIG. 17.
Figure 36:
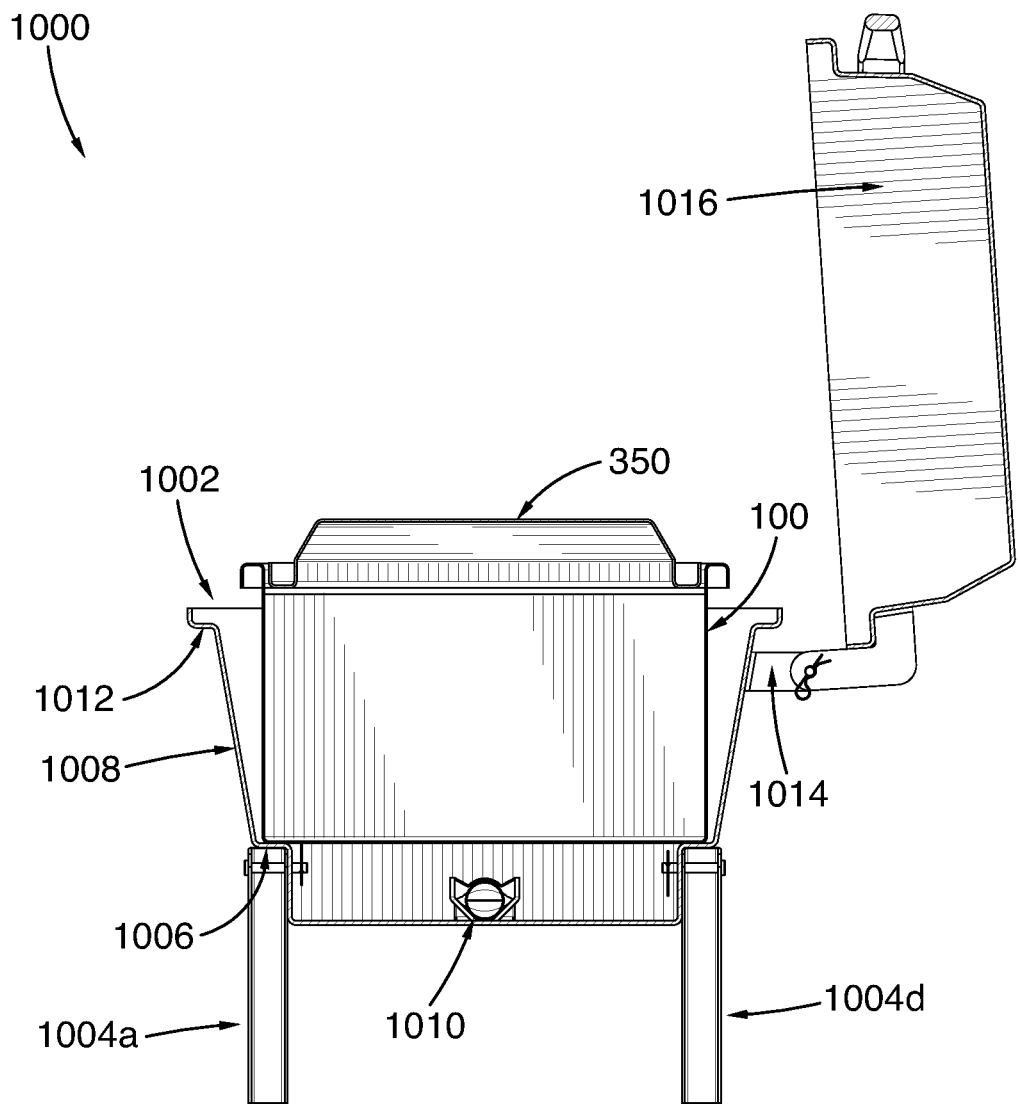
FIG. 36 is a right cross-sectional view of the portable gas barbecue of FIG. 35, with the large basin and the lid positioned in the heating compartment of the portable gas barbecue.

While the above embodiments have been described in accordance with a house barbecue (whether stationary or mounted on casters), the person of skill in the art will understand that other types of gas barbecues could be used. For instance, FIGS. 35 and 36 show an embodiment of a portable gas barbecue 1000 adapted to receive the previously mentioned add-on components 100, 200, 300, 350, 400, 500, 600, 700, 800 and 900. The portable gas barbecue 1000 comprises a heating compartment 1002 at the upper end thereof, smaller than heating compartment 18, and four retractable legs 1004a, 1004b, 1004c and 1004d at the lower end thereof for supporting the heating compartment 1002. A peripheral wall 1008 extends from the lower end to the upper end, and comprises, at the lower end thereof, an outward extending step 1006, found in most typical gas barbecues, vertically distant from the burner 1010. The upper end of the peripheral wall 1008 of the heating compartment 1002 comprises an outward extending step 1012, for receiving a main grid, and an outward extending protrusion 1016, for connecting a pivoting lid 1018 which will cover the heating compartment 1002.

The portable gas barbecue 1000 is adapted to receive the previously mentioned add-on components or any combination of them. In FIGS. 35 and 36, the large basin 100 and the lid 350 are combined and received in the heating compartment 1002 of the portable gas barbecue 1000. The large basin 100 is installed in the heating compartment 1002 by abutting the external surface 112 of the bottom wall 102 onto the step 1006 of the heating compartment 1002. The large basin is therefore located at a predetermined distance from the burner 1010 thus maximizing heat transfer. The lid 350 is subsequently installed on the large basin 100 as previously described.

The portable gas barbecue 1000 can sequentially receive different add-on components 100, 200, 300, 350, 400, 500, 600, 700, 800 and 900 for enabling different types of cooking. For example, a large basin 100 associated with a perforated flat basin 400 and a lid 350 for steam cooking could first be installed in the main cavity of the portable gas barbecue 1000. Once the steam cooking is done a second user could combine a flat basin 300 with a perforated plate system 600 in order to have smoke cooking. The main grid would therefore be positioned on step 1012 for receiving food to be cooked.

The modular barbecue system 1 allows for the previously described add-on components to be combined in order to offer different types of cooking, thus converting the gas barbecue into a different type of barbecue. The previously described embodiments expose the modularity of the gas barbecue and the portable gas barbecue 1000 comprising a variety of components and accessories granting the user the possibility to expand the functionality of a traditional gas grill barbecue to several methods of cooking, in addition to grill cooking, without having to buy a different barbecue for each use.

While in the above embodiments the modular barbecue system 1 has been described in conjunction with heating compartment 18 specifically designed to receive a plurality of add-on components 100, 200, 300, 350, 400, 500, 600, 700, 800 and 900, it is also contemplated to provide a modular barbecue system for barbecue grills configured in a more conventional way. Indeed, conventional barbecue grills are generally provided with a heating compartment including a single step, located relatively close to the burners mounted at the bottom of the heating compartment. Therefore, in one embodiment, there is provided a kit for converting a barbecue grill into a modular barbecue system, by making use of a step base that can be positioned in the heating compartment to allow receiving the plurality of add-on components.

In a first embodiment of a step base, the step base comprises spaced-apart legs having their lower ends in contact with the bottom wall of the heating compartment and upper ends. The step base also comprises a cross-member connecting the legs via their upper ends and adapted to receive the add-on components thereon. In one embodiment, the cross-member is telescopic. For instance, the cross-member can comprise male and female connecting ends allowing for the step base to telescopically modify its width. As it will be appreciated, this cross-member configuration allows to accommodate different widths of heating compartments to better fit various gas barbecues. In another embodiment, the legs are height adjustable legs enabling to accommodate different distances relative to the bottom wall and the burners of the heating compartment to enable the different add-on components to have an optimized heat transfer when received on the step base.

In another alternative embodiment of a step base, the step base is configured to be removably mounted to the front and back walls of the heating compartment of a gas barbecue instead of being mounted on the bottom wall. In this configuration, the step base comprises one or multiple pairs of arms that can be positioned along the front and back walls, from the upper end of the heating compartment to the lower end of the heating compartment. At the upper end thereof, the pairs of arms comprise a hook adapted to engage the upper step designed to receive a cooking grid. In this embodiment, the arms comprise, at different heights, a plurality of steps in the form of protrusions, extending towards the center of the heating compartment, and adapted to receive add-on components thereon. At the lower end thereof, each pair of arms is connected via a cross-member. In one embodiment, each arm comprises a pivot connecting the cross-member, the pivot allowing for the step base to accommodate different angles of the front and back walls relative to the bottom wall. The cross-member is preferably telescopic and comprises for instance male and female connecting ends allowing for a telescopic movement enabling step base to accommodate different widths of heating compartments as the step base is removably received in various gas barbecues.

It should be understood that a person of skill in the art would understand that modifications and adaptations are possible to adapt the add-on components to a different size and shape of barbecue without departing from the scope of the invention.

The embodiments described above are intended to be exemplary only. The scope of the invention is therefore intended to be limited solely by the appended claims.

The invention claimed is:

1. A kit of combinable add-on components for a barbecue including a heating compartment, the kit of combinable add-on components comprising a perforated plate system, a first basin and at least one add-on component selected from the group comprising a second basin, a lid, a perforated basin and a grid, the at least one add-on component being receivable on the heating compartment, the first basin being selectively receivable on the heating compartment and on the at least one add-on component, and the perforated plate system being selectively receivable on the first basin and on the at least one add-on component, wherein the perforated plate system comprises a first perforated plate mountable to the first basin and comprising at least one first perforation and a second plate slidably mountable on top of the first perforated plate and comprising at least one second perforation, the at least one second perforation being fully aligned with the at least one first perforation when the second plate is positioned on top of the first perforated plate and is slid in a first position relative to the first perforated plate, the at least one second perforation being in a fully offset position when the second plate is positioned on top of the first perforated plate and is slid in a second position.

2. The kit according to claim 1, wherein the first basin is a rectangular basin, and wherein:

the first perforated plate defines a generally rectangular shape sized to fit on top of the first basin and comprises an external surface, an internal surface and the at least one first perforation extending from the external surface to the internal surface, the first perforated plate further comprising first and second ends each comprising a downward extending lip; and the second plate defines a generally rectangular shape sized to fit on top of the first plate and comprises an external surface, an internal surface and the at least one second perforation extending from the external surface to the internal surface and corresponding to the plurality of holes of the first plate, the second plate further comprising first and second ends each comprising a downward extending lips, wherein the lips of the second plate overlap the lips of the first plate to guide sideward movement of the second plate relative to the first plate between the first position and the fully offset position.

3. The kit according to claim 2, wherein the first plate further comprises a left and right sides each comprising an upwardly extending lip defining a first distance therebetween, the second plate further comprising left and right sides each comprising an upwardly extending lip defining a second distance therebetween, wherein the distance between the right and left lips of the first plate is greater than the distance between right and left lips of the second plate to allow sideward movement of the second plate relative to the first plate.

4. The kit according to claim 3, wherein the right and left lips of the first plate act as stoppers engaging the right and left lips of the second plate to limit sideward movement of the second plate relative to the first plate.

5. The kit according to claim 1, wherein the first basin comprises a flat basin adapted to receive a solid combustible therein.

6. The kit according to claim 5, wherein the solid combustible is selected from the group consisting of wood, charcoal and briquettes.

7. The kit according to claim 1, wherein the first basin comprises a large basin.

8. The kit according to claim 7, wherein the at least one component comprises the lid.

9. A kit of combinable add-on components for a barbecue including a heating compartment, the kit of combinable add-on components comprising at least two add-on components selected from the group comprising a first basin, a second basin, a lid, a perforated basin, a perforated plate system and a grid, a first of the at least two add-on components being receivable on the heating compartment and a second of the at least two add-on components being selectively receivable on the heating compartment and on the first of the at least two add-on components, wherein the first of the at least two add-on components is the first basin and the second of the at least two add-on components is the second basin, wherein the first basin is a first large basin and the second basin is a second large basin, the first and second large basins being positionable in a side-by-side relationship on the heating compartment, the kit further comprising a syphon to removably engage the first and second large basins when they are positioned in the side-by-side relationship and to allow a fluid communication between the same.

10. The kit according to claim 9, further comprising an anti-foaming container receivable in one of the first and second large basins.

11. A kit of combinable add-on components for a barbecue including a heating compartment, the kit of combinable add-on components comprising at least two add-on components selected from the group comprising a first basin, a second basin, a lid, a perforated basin, a perforated plate system and a grid, a first of the at least two add-on components being receivable on the heating compartment and a second of the at least two add-on components being selectively receivable on the heating compartment and on the first of the at least two add-on components, wherein the first of the at least two add-on components comprises the first basin, the kit further comprising a pump removably receivable in the first basin for pumping a liquid therefrom.

12. The kit according to claim 11, wherein the pump is operatively coupled to one of a shower and a sink.

13. The kit according to claim 11, wherein the first basin comprises a large basin.

* * * * *